United States Patent
Oya

(10) Patent No.: US 10,585,922 B2
(45) Date of Patent: Mar. 10, 2020

(54) FINDING A RESOURCE IN RESPONSE TO A QUERY INCLUDING UNKNOWN WORDS

(71) Applicant: INTERNATIONAL BUSINESS MACHINES CORPORATION, Armonk, NY (US)

(72) Inventor: Hiroki Oya, Shinagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 94 days.

(21) Appl. No.: 15/986,813

(22) Filed: May 23, 2018

(65) Prior Publication Data
US 2019/0362019 A1 Nov. 28, 2019

(51) Int. Cl.
*G06F 17/27* (2006.01)
*G06F 16/33* (2019.01)
(Continued)

(52) U.S. Cl.
CPC ........ *G06F 16/3334* (2019.01); *G06F 16/951* (2019.01); *G06F 17/2735* (2013.01);
(Continued)

(58) Field of Classification Search
CPC combination set(s) only.
See application file for complete search history.

(56) References Cited

U.S. PATENT DOCUMENTS 4,706,212 A * 11/1987 Toma .................... G06F 17/271
704/2
8,589,386 B2 11/2013 Victoria et al.
(Continued)

FOREIGN PATENT DOCUMENTS

CN 106815195 6/2017
JP 2006331001 12/2006
(Continued)

OTHER PUBLICATIONS

"International Search Report and Written Opinion of the International Searching Authority", dated Sep. 9, 2019, PCT/IB2019/054053, filed May 16, 2019, 7 pages.

*Primary Examiner* — Abul K Azad
(74) *Attorney, Agent, or Firm* — Feb Cabrasawan; Amy J. Pattillo

(57) ABSTRACT

A computer receives a search query from a user for finding a resource. The computer extracts one or more words from the search query using morphological analysis. The computer assigns at least one first category to at least one first word of the one or more words using a dictionary. In response to identifying an unknown word not in the dictionary within the one or more words, the computer searches for the unknown word on a net. If the unknown word is found on the net, the computer obtains a description on a page on the net on which the unknown word is found, extracts one or more second words from the description using morphological analysis, assigns, using the dictionary, at least one second category to the one or more second words extracted from the description, finds, among the one or more second words, a particular word to which a predetermined category was assigned, extracts a correlation word from among the one or more second words having a high correlation with the found particular word, and finds, among the first words, a search word assigned the at least one first category that is the same as the predetermined category, finds, from a repository, resource data or worksite data using the correlation word and the search word, and lists the found resource data.

20 Claims, 23 Drawing Sheets

(51) Int. Cl.
*G10L 15/08* (2006.01)
*G06F 16/951* (2019.01)

(52) U.S. Cl.
CPC .......... *G06F 17/2755* (2013.01); *G10L 15/08* (2013.01); *G10L 2015/088* (2013.01)

(56) References Cited

U.S. PATENT DOCUMENTS

| | | | |
|---|---|---|---|
| 9,703,873 B2 | 7/2017 | Fakeih | |
| 2005/0038866 A1* | 2/2005 | Noguchi | G06F 16/951 709/217 |
| 2009/0138565 A1* | 5/2009 | Shiff | G06Q 30/02 709/206 |
| 2010/0257150 A1 | 10/2010 | Lu et al. | |
| 2014/0304249 A1 | 10/2014 | Ayzenshtat et al. | |
| 2015/0066964 A1* | 3/2015 | Makino | G06Q 40/04 707/755 |
| 2015/0161144 A1* | 6/2015 | Goto | G06F 17/275 707/739 |
| 2015/0161263 A1 | 6/2015 | Lang et al. | |
| 2015/0317376 A1 | 11/2015 | Bauer et al. | |

FOREIGN PATENT DOCUMENTS

| | | |
|---|---|---|
| JP | 2013114586 | 6/2013 |
| JP | 2015014877 | 1/2015 |
| JP | 2015130102 | 7/2015 |
| WO | 2008031062 | 6/2008 |

\* cited by examiner

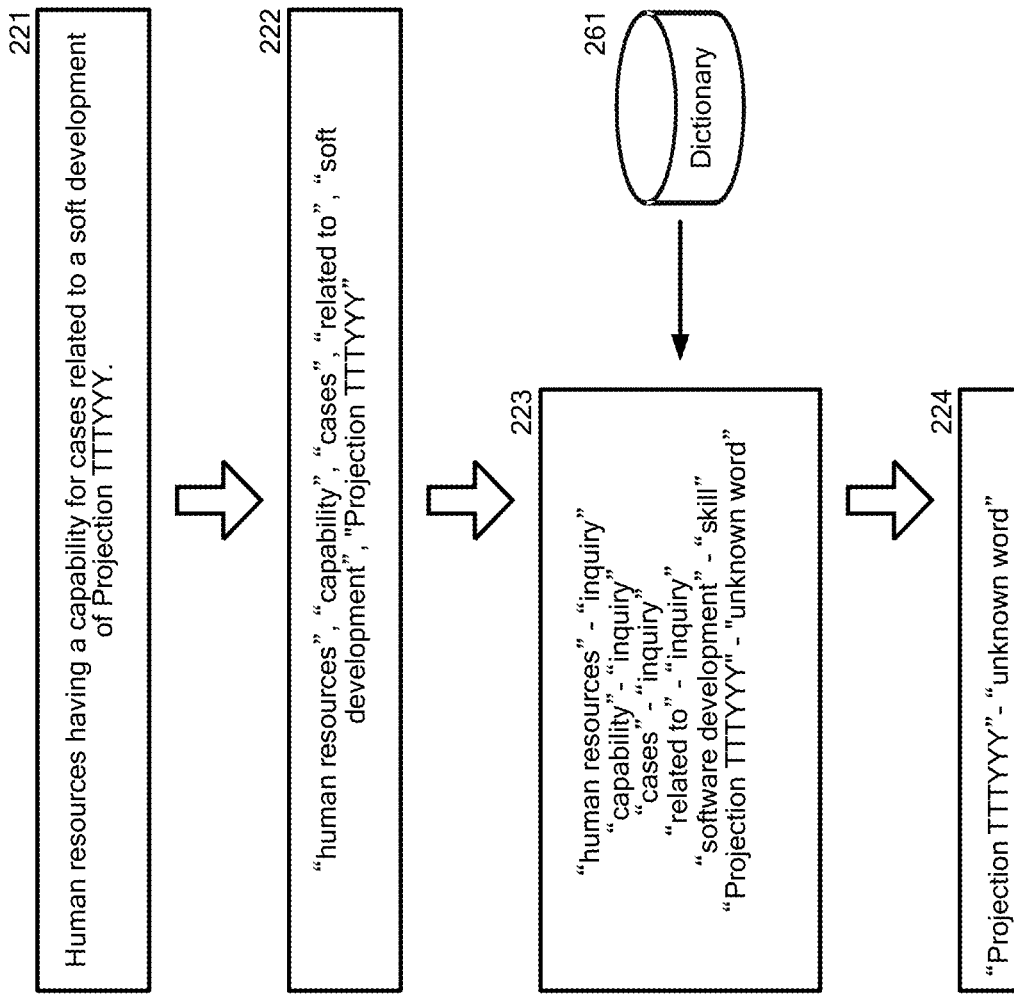

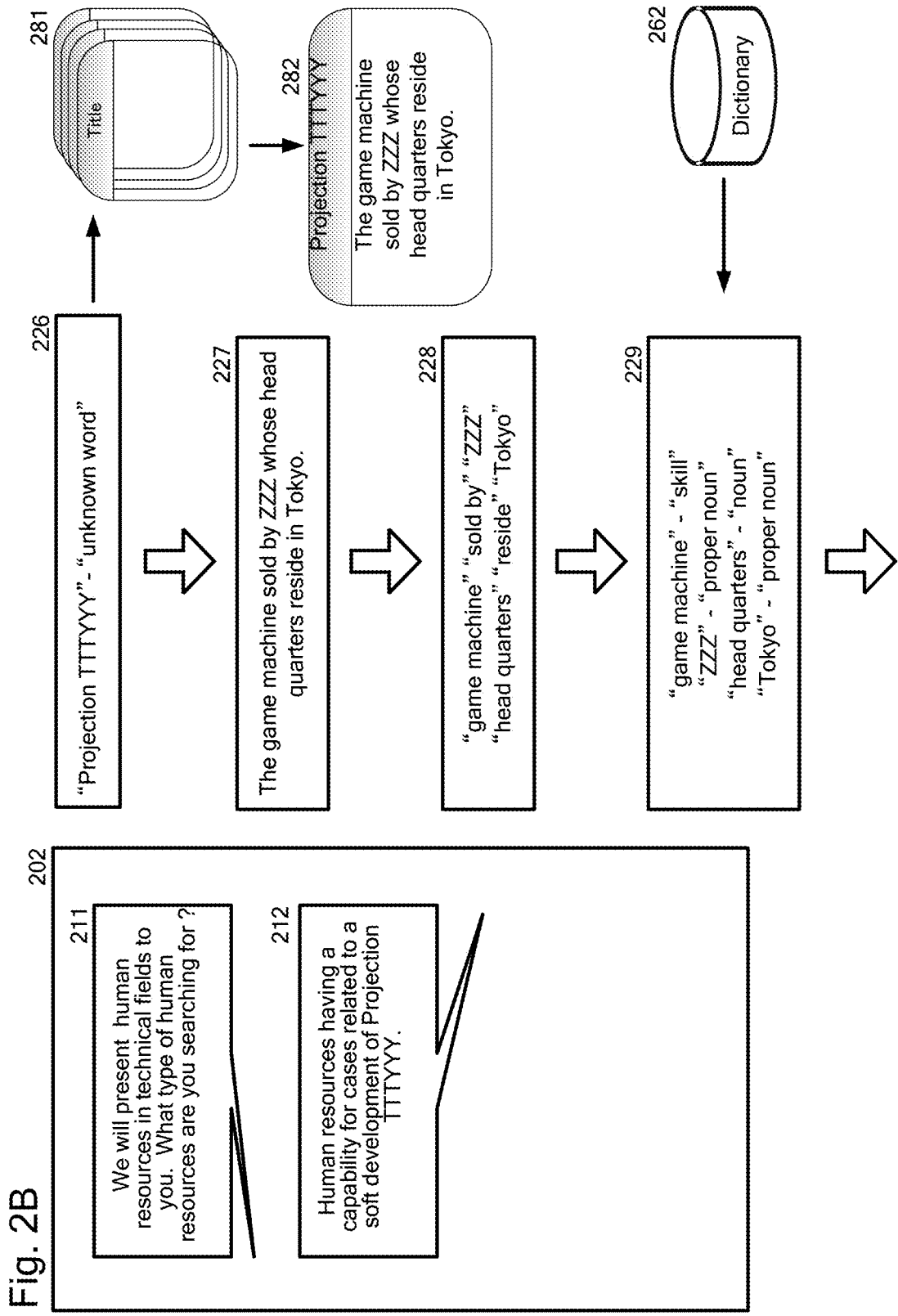

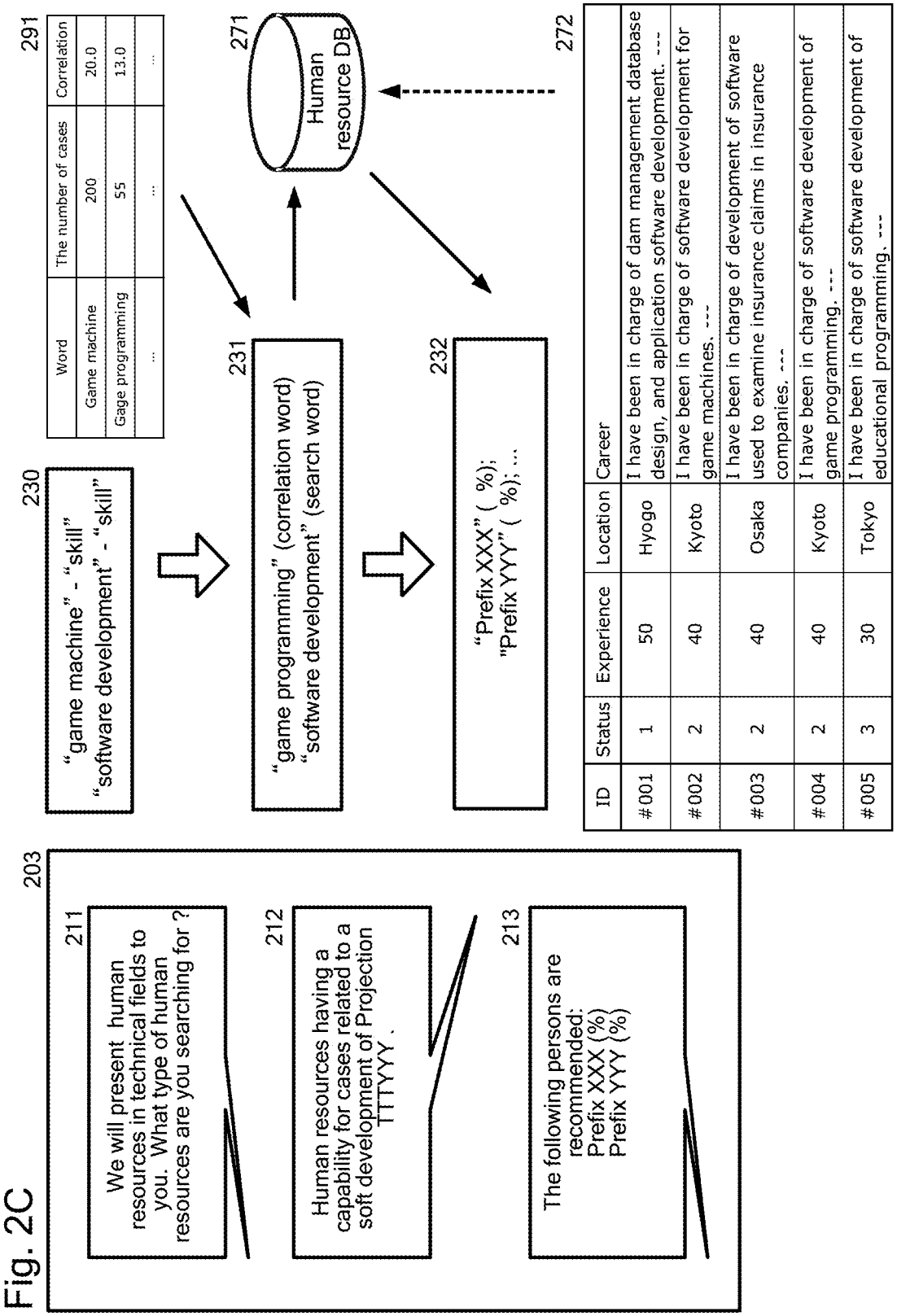

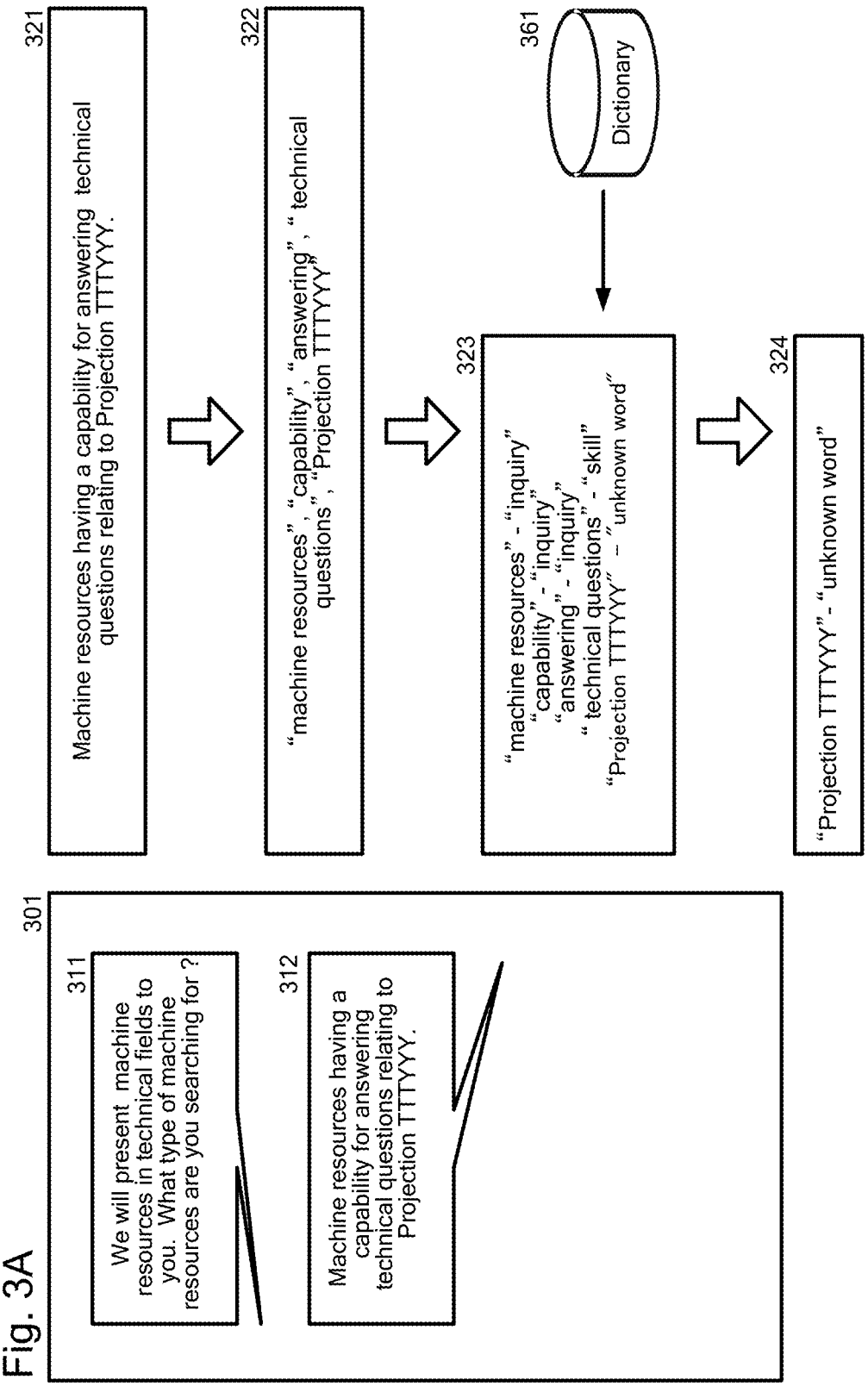

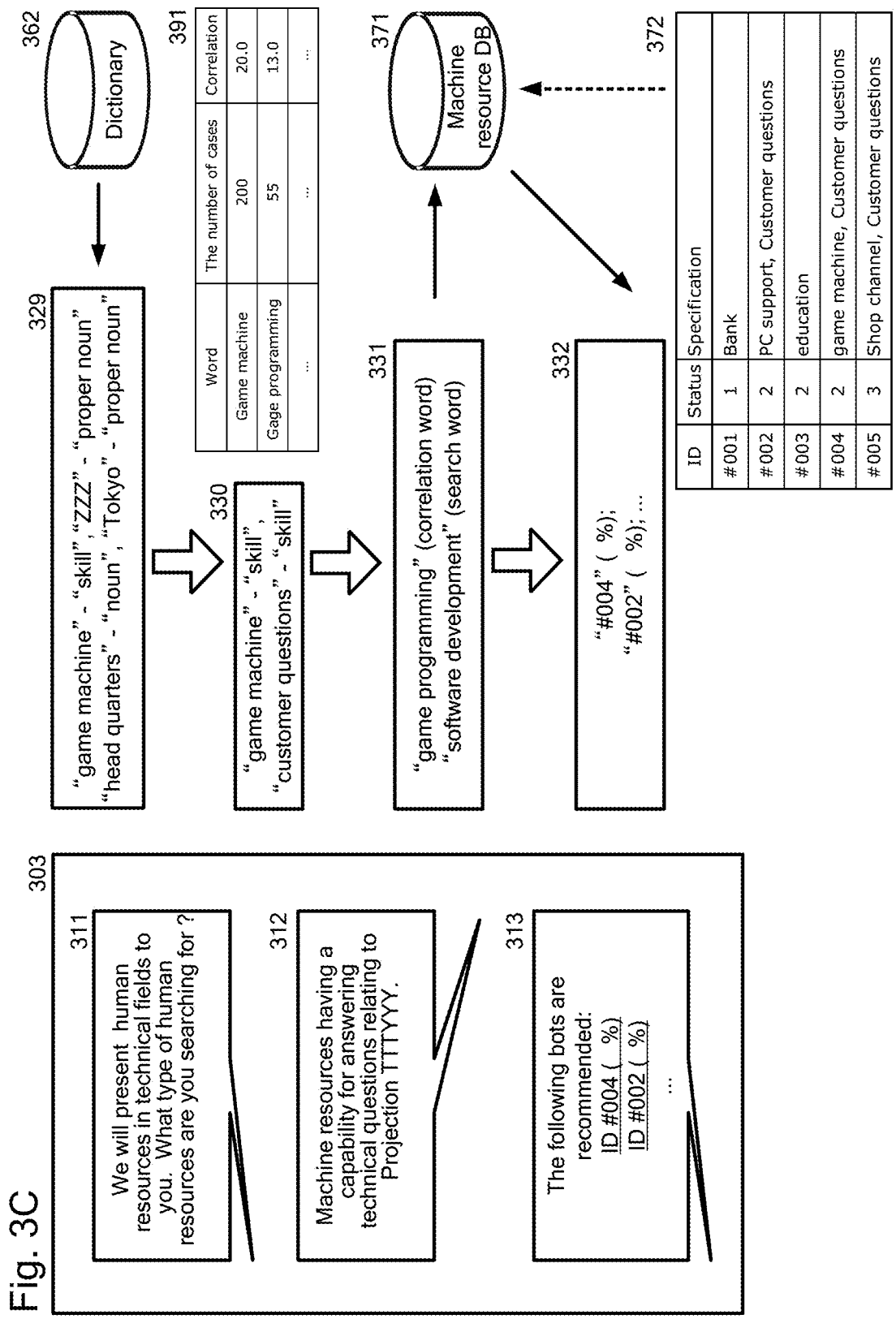

Fig. 3D
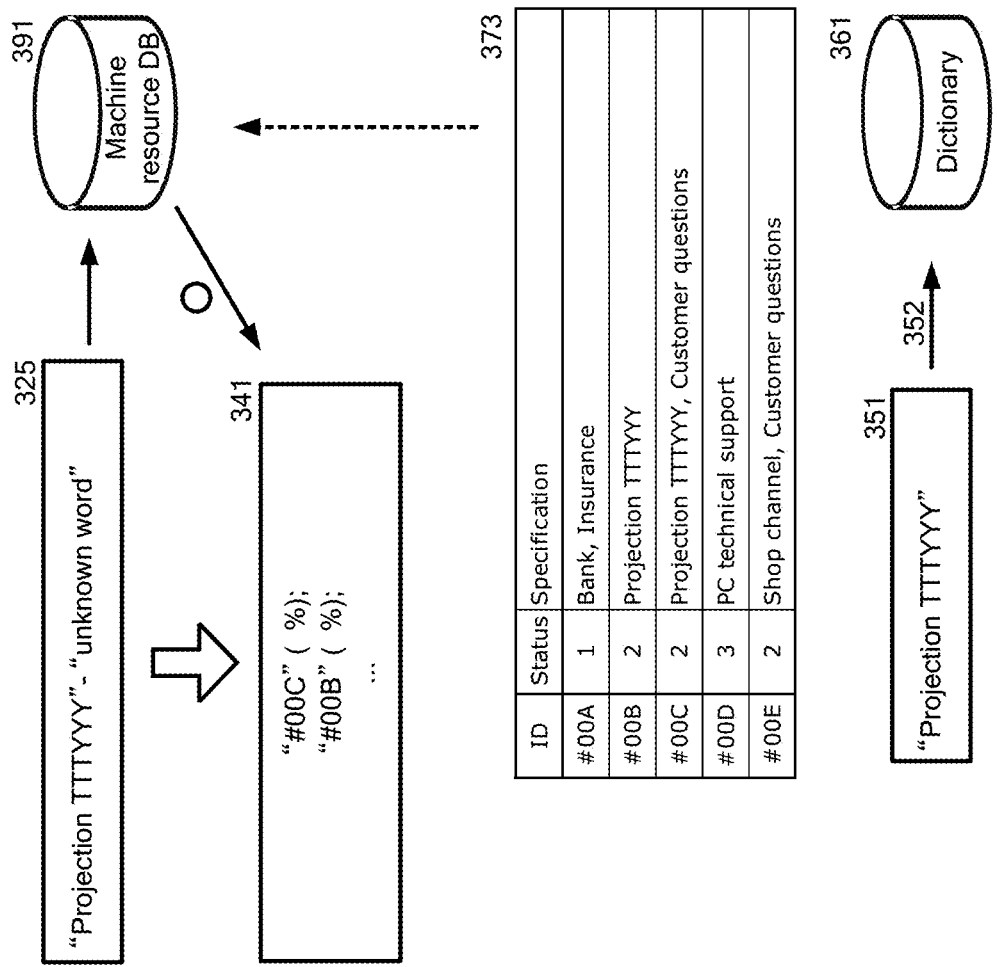
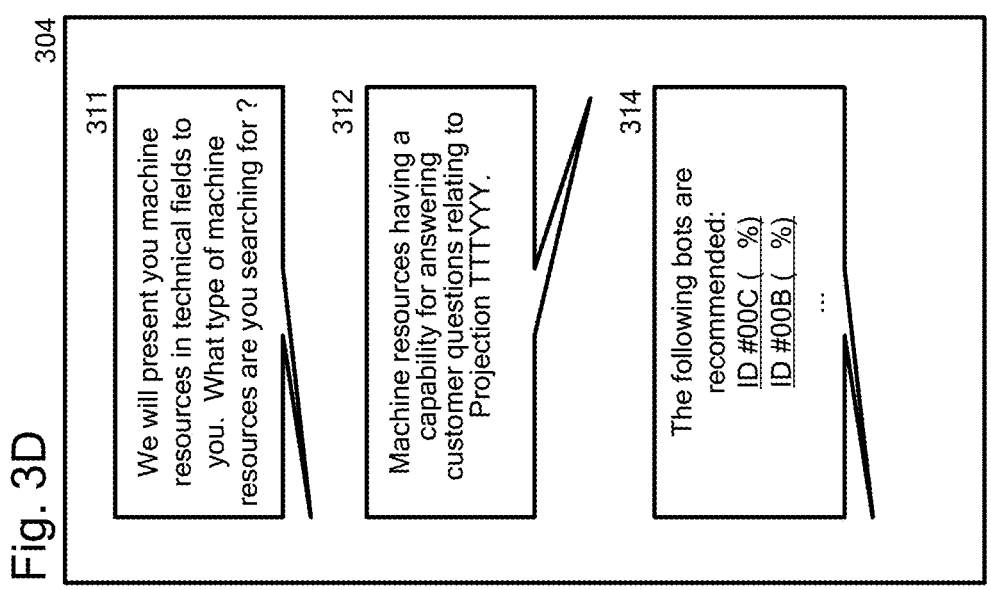

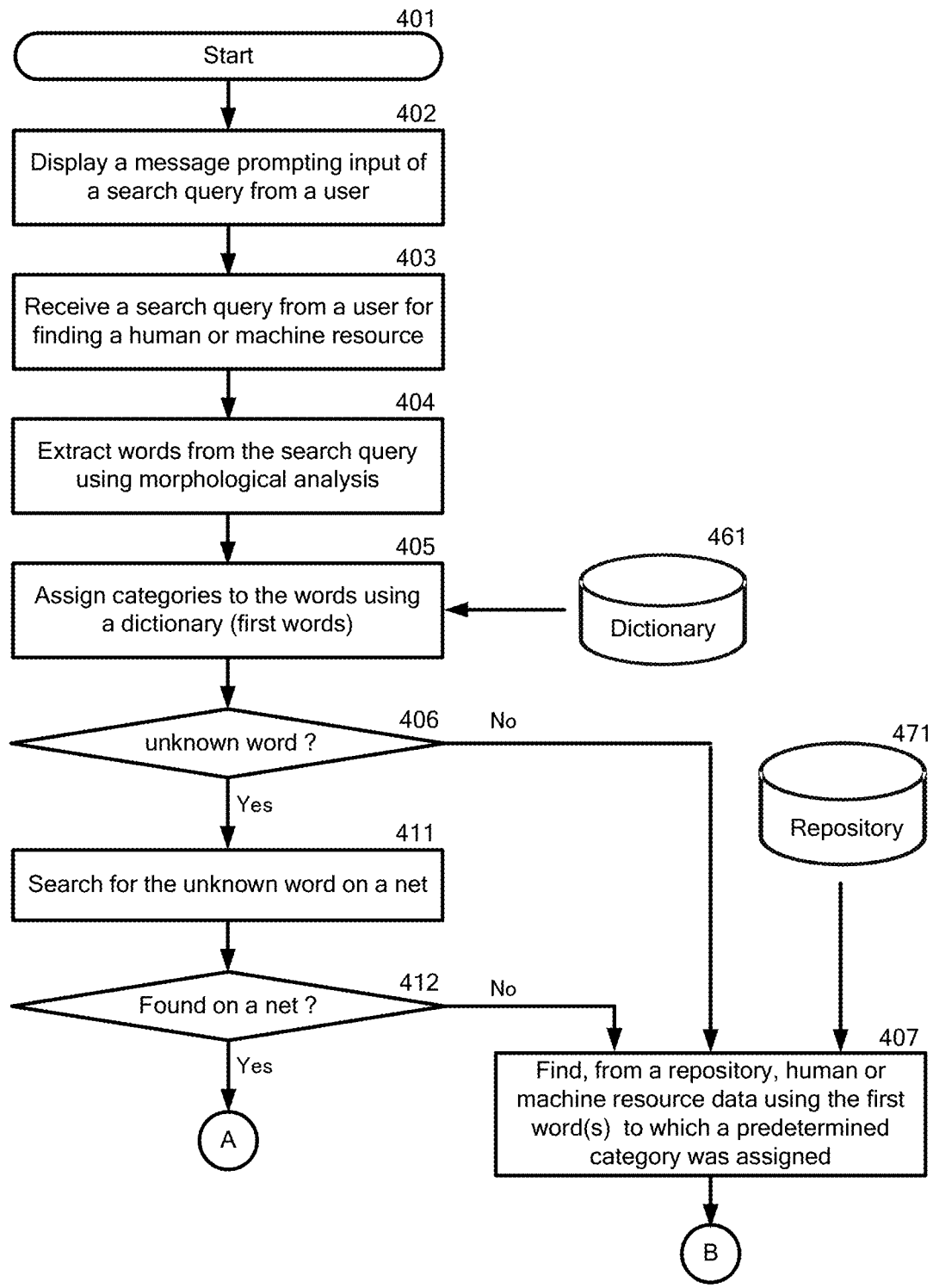

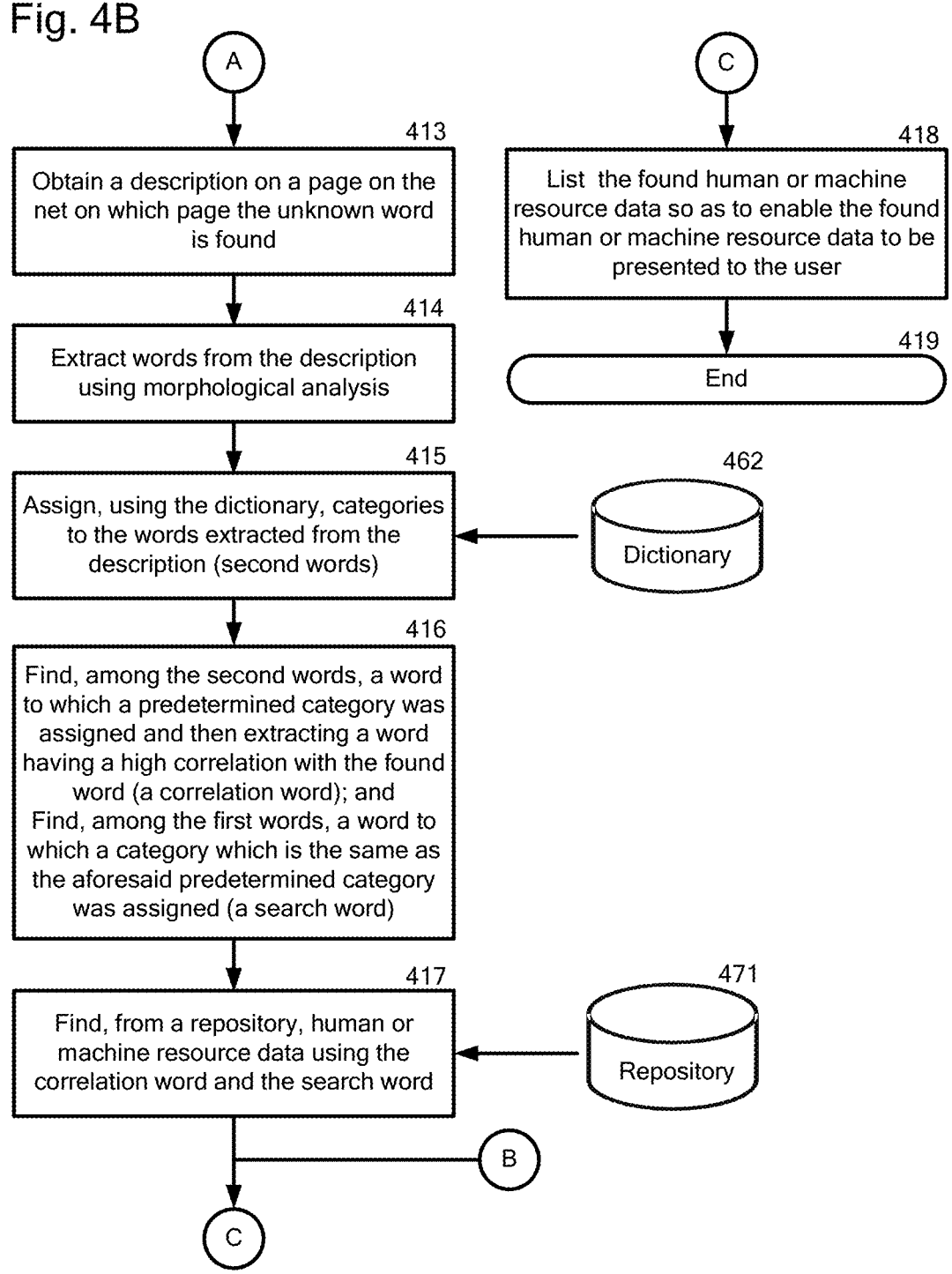

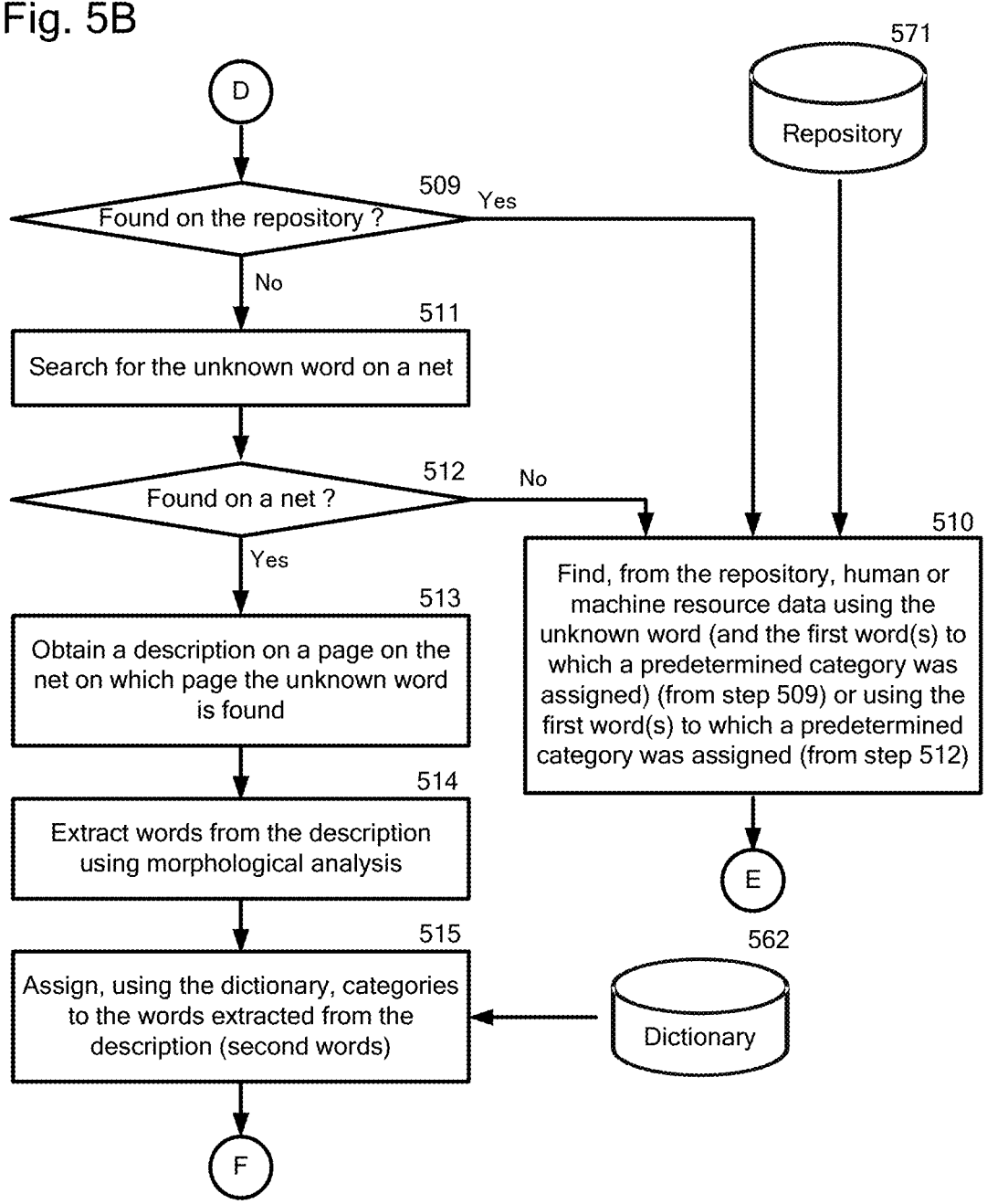

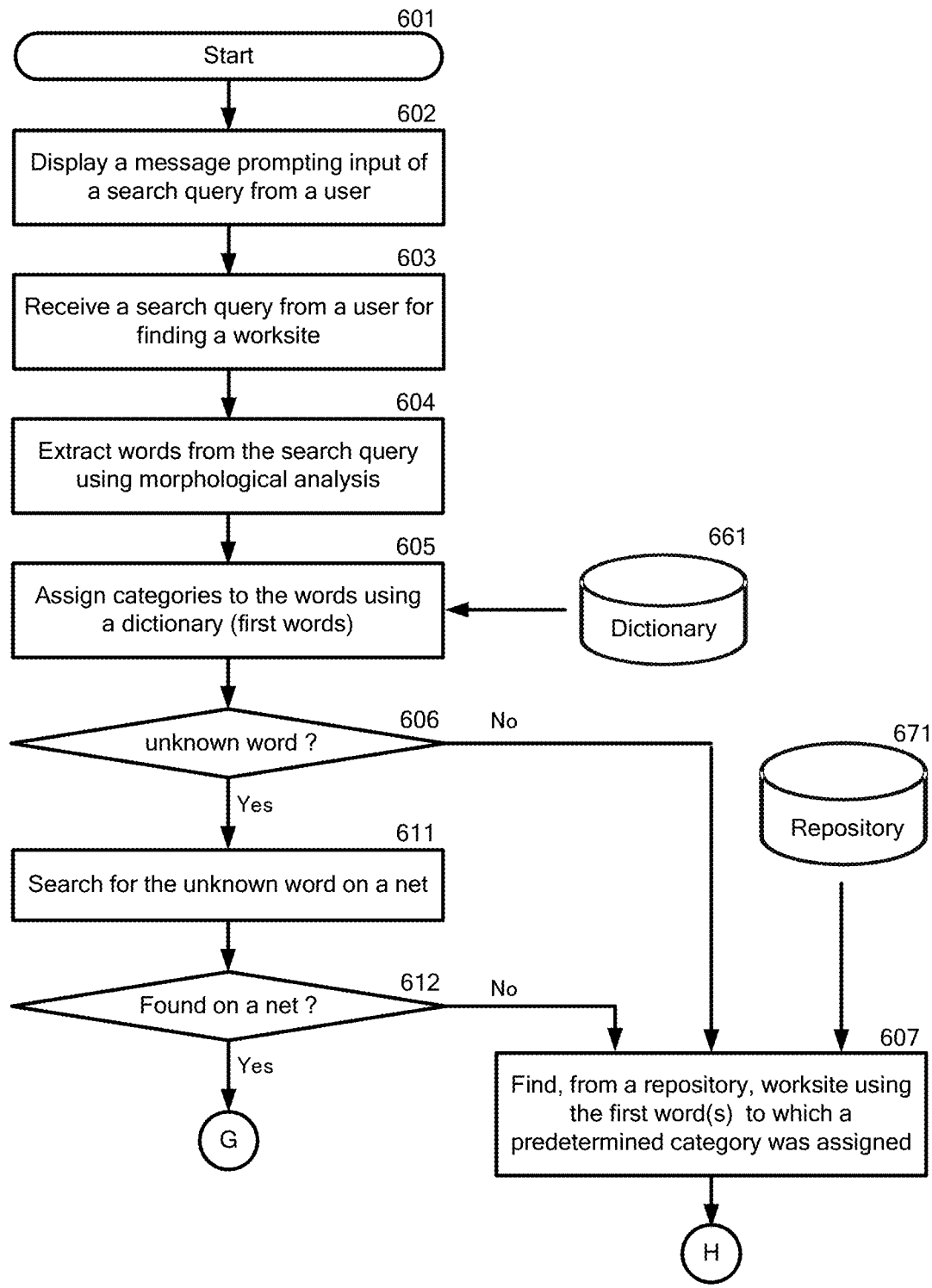

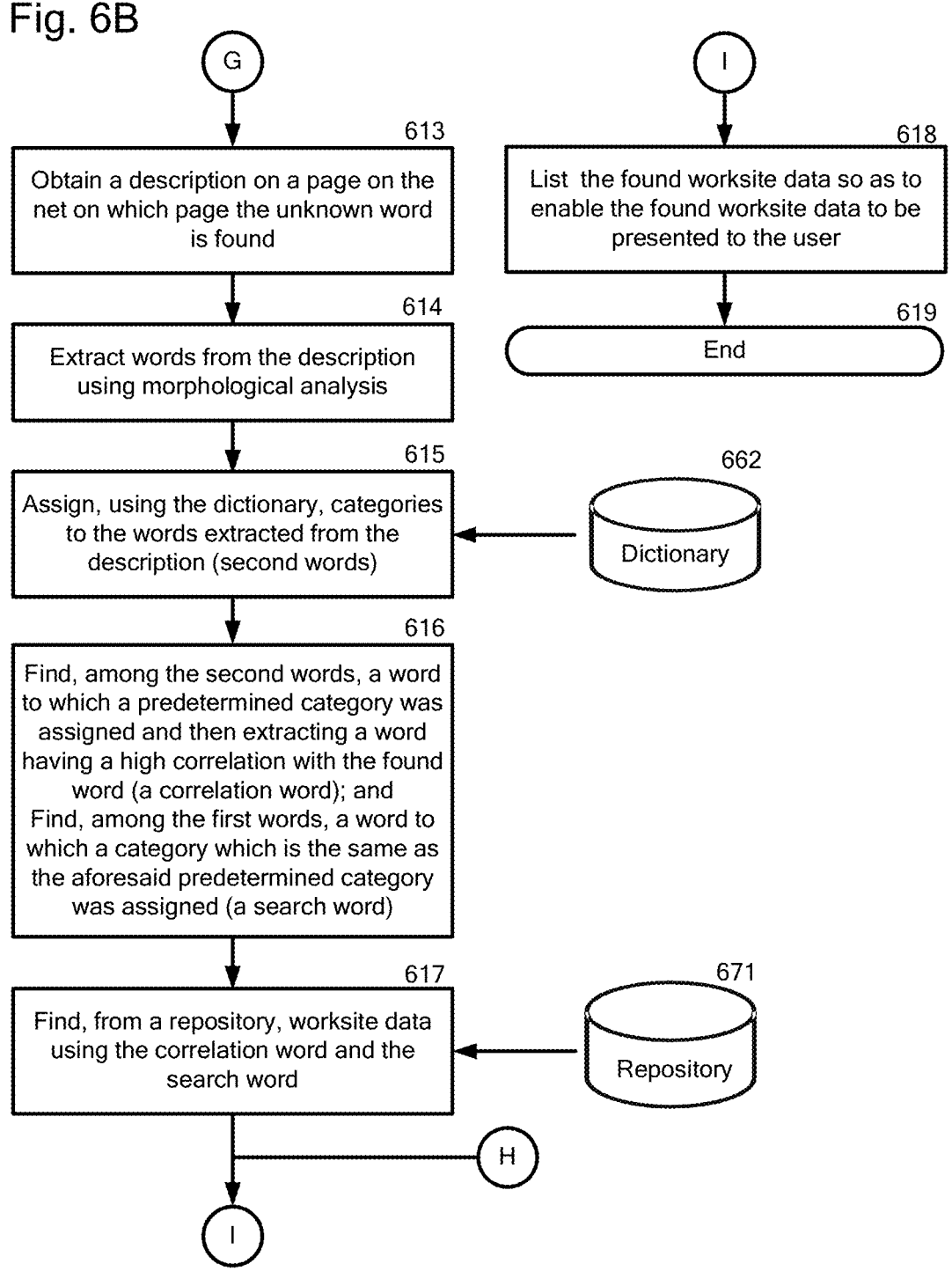

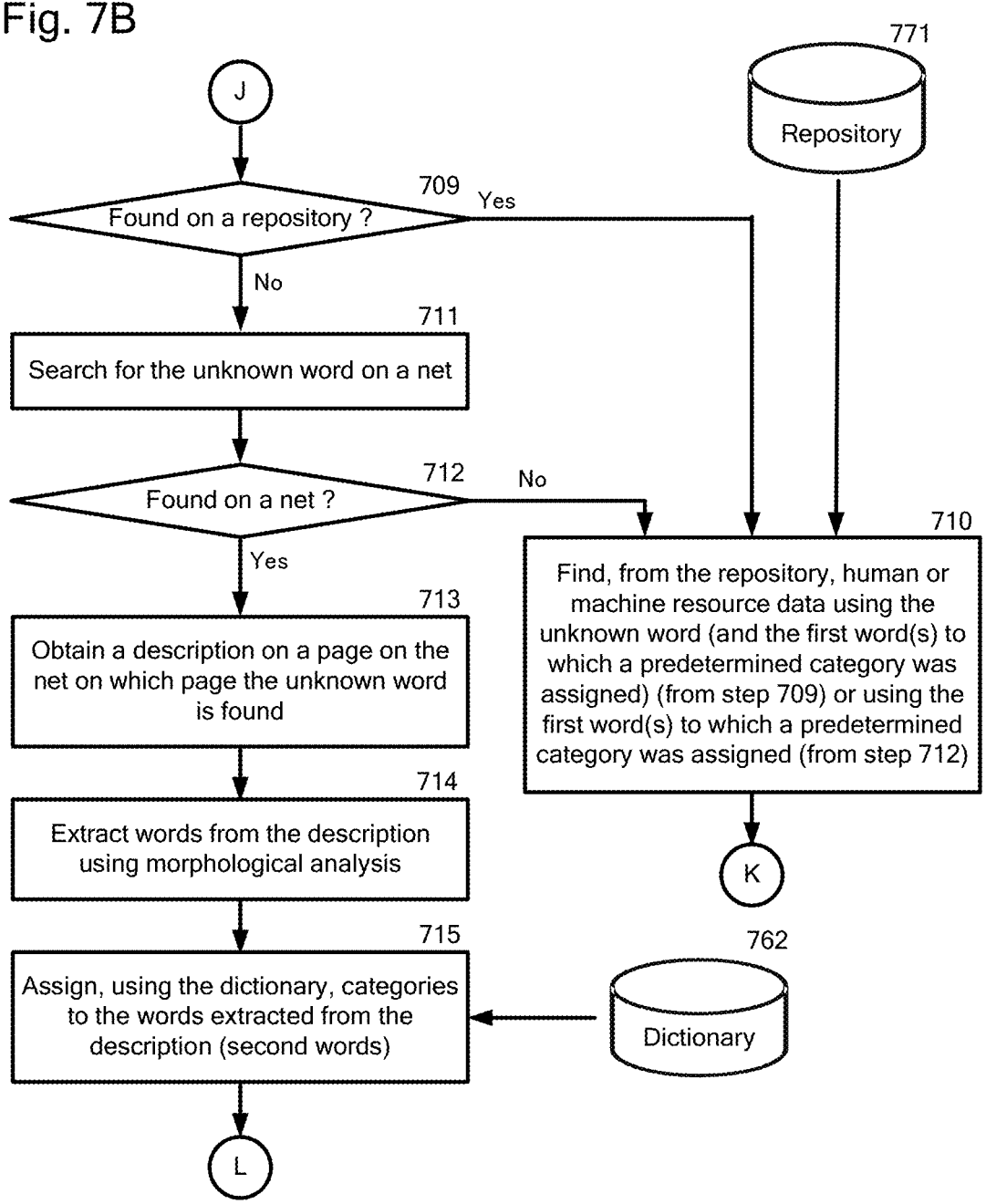

| Category | Word | Synonym |
|---|---|---|
| Skill | game machine | |
| Skill | C-language | soft development |
| Skill | software development | |
| Skill | technical questions | |
| ... | ... | |
| Inquiry | capability | |
| Inquiry | human resource(s) | |
| Inquiry | machine resource(s) | |
| Inquiry | worksite(s) | |
| ... | ... | |

802

| Category | Word | Synonym |
|---|---|---|
| Noun | game | |
| Noun | language | |
| Noun | software development | soft development |
| Noun | technical questions | tech quesitons |
| ... | ... | |
| Proper noun | ZZZ | |
| Proper noun | Tokyo | |
| ... | ... | |
| Verb | play | |
| ... | ... | |

| Experience | The number of cases |
|---|---|
| 20 | ... |
| 30 | 2000 |
| 40 | 1000 |
| 50 | 1000 |
| 60 | ... |
| Total | ... |

812

| Experience | The number of cases | Correlation |
|---|---|---|
| 30 | 25 | 0.5 |
| 40 | 50 | 2 |
| 50 | 25 | 1 |
| Total | 100 | - |

FINDING A RESOURCE IN RESPONSE TO A QUERY INCLUDING UNKNOWN WORDS

BACKGROUND

1. Technical Field

One or more embodiments of the invention relate generally to data processing, and particularly to finding a resource in response to a query including one or more unknown words.

2. Description of the Related Art

Chatbots, also known as talkbots, chatterbots, Bots, instant messaging (IM) bots, interactive agents or artificial conversational entities, are like virtual assistants that can conduct a conversation via auditory or textual methods.

Chatbots have been getting a lot of attention regarding how chatbots can help organizations with various customer-facing tasks, such as customer service.

SUMMARY

In one embodiment of the invention, a method is directed to receiving, by a computer, a search query from a user for finding a resource. The method is directed to extracting, by the computer, one or more words from the search query using morphological analysis. The method is directed to assigning, by the computer, at least one first category to at least one first word of the one or more words using a dictionary, wherein the dictionary comprises one or more pairs of a separate word from among a plurality of words and a particular category from among a plurality of categories associated with the separate word. The method is directed to, in response to identifying an unknown word not in the dictionary within the one or more words, searching, by the computer, for the unknown word on a net. The method is directed to, in response to finding the unknown word on the net: obtaining by the computer, a description on a page on the net on which page the unknown word is found; extracting, by the computer, one or more second words from the description using morphological analysis; assigning, by the computer, using the dictionary, at least one second category to the one or more second words extracted from the description; finding, among the one or more second words, a particular word to which a predetermined category was assigned, extracting a correlation word from among the one or more second words having a high correlation with the found particular word, and finding, in the dictionary, a search word from among the one or more first words assigned the at least one first category that is the same as the predetermined category; finding, from a repository, by the computer, resource data using the correlation word and the search word; and listing, by the computer, the resource data found for the resource.

In another embodiment of the invention, a computer system is provided. The computer system may include one or more processors and a memory storing a program which, when executed on the processor, performs one or more operations for finding a resource. The one or more operations comprising receiving a search query from a user for finding the resource. The one or more operations comprising extracting one or more words from the search query using morphological analysis. The one or more operations comprising assigning at least one first category to at least one first word of the one or more words using a dictionary, wherein the dictionary comprises one or more pairs of a separate word from among the plurality of words and a particular category from among a plurality of categories associated with the separate word. The one or more operations comprising, in response to identifying an unknown word not in the dictionary within the one or more words, searching for the unknown word on a net. The one or more operations comprising, in response to finding the unknown word on the net: obtaining a description on a page on the net on which page the unknown word is found; extracting one or more second words from the description using morphological analysis; assigning, using the dictionary, at least one second category from among the plurality of categories to the one or more second words extracted from the description; finding, among the one or more second words, a particular word to which a predetermined category was assigned, extracting a correlation word from among the one or more second words having a high correlation with the found particular word, and finding, in the dictionary, a search word from among the one or more first words assigned the at least one first category that is the same as the predetermined category; finding, from a repository, resource data using the correlation word and the search word; and listing the resource data found for the resource.

In another embodiment of the invention, a computer program product is provided. The computer program product may comprise a computer readable storage medium having program instructions embodied therewith. The program instructions are executable by a computer to cause the computer to perform a method directed to receiving a search query from a user for finding a resource. The program instructions are executable by a computer to cause the computer to perform a method directed to extracting one or more words from the search query using morphological analysis. The program instructions are executable by a computer to cause the computer to perform a method directed to assigning at least one first category to at least one first word of the one or more words using a dictionary, wherein the dictionary comprises one or more pairs of a separate word from among the plurality of words and a particular category from among a plurality of categories associated with the separate word. The program instructions are executable by a computer to cause the computer to perform a method directed to, in response to identifying an unknown word not in the dictionary within the one or more words, searching for the unknown word on a net. The program instructions are executable by a computer to cause the computer to perform a method directed to, in response to finding the unknown word on the net: obtaining a description on a page on the net on which page the unknown word is found; extracting one or more second words from the description using morphological analysis; assigning, using the dictionary, at least one second category from among the plurality of categories to the one or more second words extracted from the description; finding, among the one or more second words, a particular word to which a predetermined category was assigned, extracting a correlation word from among the one or more second words having a high correlation with the found particular word, and finding, in the dictionary, a search word from among the one or more first words assigned the at least one first category that is the same as the predetermined category; finding, from a repository, resource data using the correlation word and the search word; and listing the resource data found for the resource to the user.

BRIEF DESCRIPTION OF THE DRAWINGS

The disclosure will provide details in the following description of one or more embodiments with reference to the following figures. The figures are not necessarily to scale. The figures are merely schematic representations, not intended to portray specific parameters of the one or more embodiments of the invention. The figures are intended to depict only typical embodiments of the invention. In the figures, like numbering represents like elements. The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIGS. 2A to 2C are a block diagram depicting one example of a computer-implemented method for finding a human resource, in accordance with an embodiment of the present invention;

FIGS. 3A to 3D are a block diagram depicting one example of a computer-implemented method of finding a machine resource, in accordance with an embodiment of the present invention;

FIGS. 4A and 4B are high level logic flowcharts depicting a process and computer program of one example of finding a human or machine resource, in accordance with an embodiment of the present invention;

FIGS. 5A to 5C are high level logic flowcharts depicting a process and computer program of one example of finding a human or machine resource, in accordance with another embodiment of the present invention;

FIGS. 6A and 6B are high level logic flowcharts depicting a process and computer program of one example of finding a worksite for a human or machine resource, in accordance with an embodiment of the present invention;

FIGS. 7A to 7C are high level logic flowcharts depicting a process and computer program of one example of finding a worksite for a human or machine resource, in accordance with another embodiment of the present invention;

FIG. 8A is a table depicting an example of a dictionary used in accordance with an embodiment of the present invention;

FIG. 8B is a table depicting an example of a mining result used in accordance with an embodiment of the present invention;

DETAILED DESCRIPTION

Figure 1:
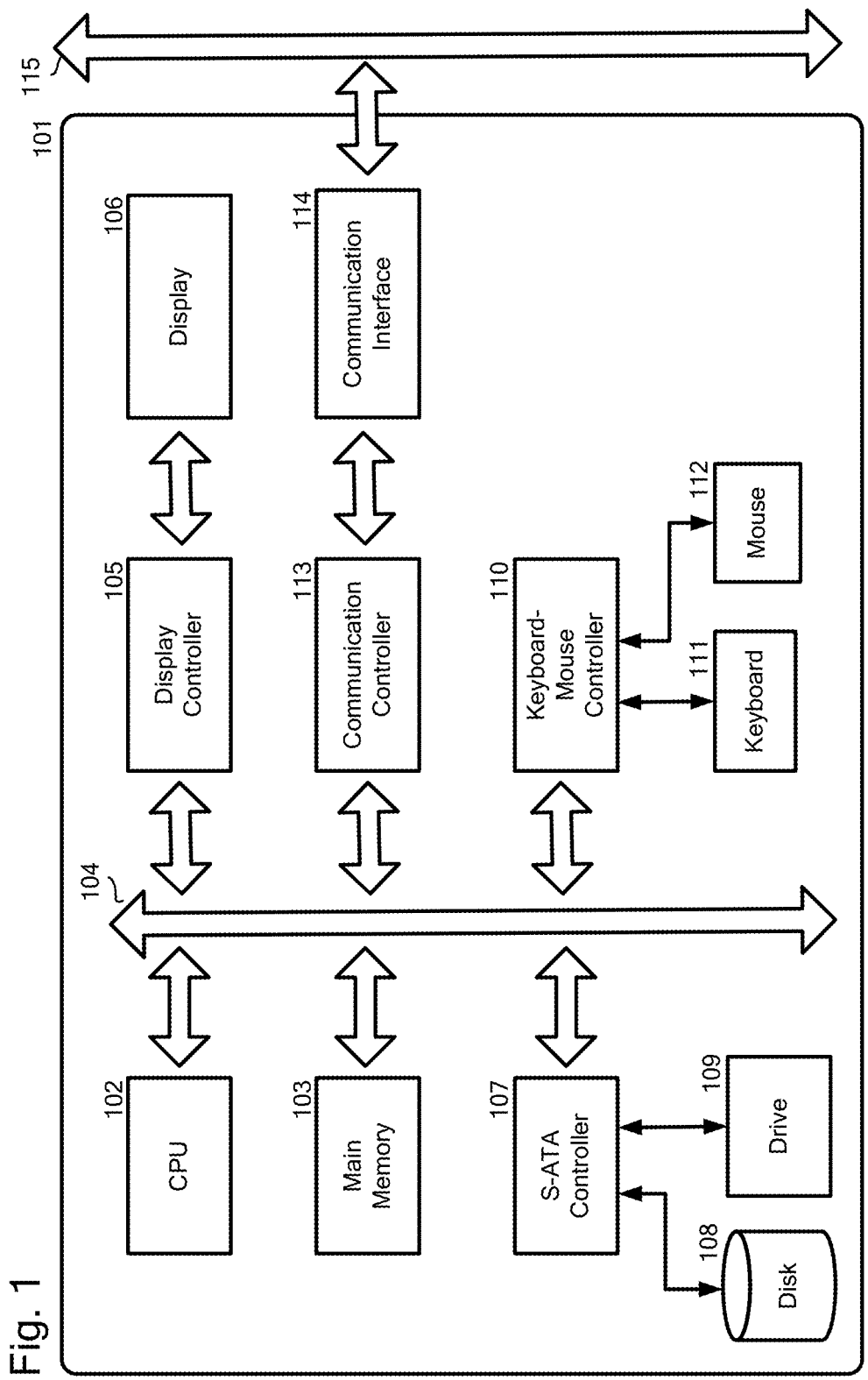
FIG. 1 is a block diagram depicting one example of a computer system used in accordance with an embodiment of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by those of skill in the art, an embodiment of the present invention may be embodied as a computer-implemented method, a computer system, or a computer program product. Accordingly, an embodiment of the present invention may take the form of an entirely hardware-based embodiment, an entirely software-based embodiment, including, for example, firmware, resident software ad micro-code, and the like, or may take the form of an embodiment combining software-based and hardware-based aspects, which may be collectively referred to herein as a "circuit," a "module," or a "system".

As used herein, the expression "a/one" should be understood as "at least one." The expression "comprise(s)/comprising a/one" should be understood as "comprise(s)/comprising at least one." The expression "comprise(s)/comprising" should be understood as "comprise(s)/comprising at least." The expression "/" should be understood as "and/or."

To define more clearly terms as used herein, exemplified definitions of the terms are provided hereinafter, this should be interpreted broadly as known to a person skilled in the art or a technical field to which the present invention pertains.

As used herein, the term "resource", may refer to one or more of, but not limited to, one or more human resources, one or more machine resources, one or more worksites for one or more human resources, and one or more worksites for one or more machine resources.

As used herein, the term "a human resource" may refer to any people who make up the members, participants, or workers of an organization, business sector, or economy. A human resource may be also referred to as "a talent", "a labour", "a personnel" or simply "people". A human resource may be, for example, but not limited to, a person who belongs to a temporary employment agency, in-house or in the same group of companies, or a freelance.

As used herein, the term "a machine resource" may refer to any machines which make up the members, participants, or workers of an organization, business sector, or economy. A machine resource may include any robots, for example, but not limited to, an industrial robot, a conversation robot, a nursing care robot and a drone or machines that resemble a living creature in being capable of moving independently, for example, as by walking or rolling on wheels, and performing complex actions, for example, but not limited to, grasping and moving objects; or devices that automatically perform complicated, often repetitive tasks, for example, but not limited to, as in an industrial assembly line.

If a machine resource may be a humanoid robot, a skill or working history of the humanoid robot may be similar with that of a human resource and associated with this humanoid robot. Accordingly, the aforesaid definitions described for a human resource may be also applied to the humanoid robot. In other words, a humanoid robot may be also regarded as a human resource.

As used herein, the term "a worksite for a human resource" may refer to a location where a human resource works for his or her employer, a place of employment. Such a place can be any office such as an office ranging from a home office to office building or factory. "A worksite for a human resource" may be also referred to as "a workplace for a human resource".

As used herein, the term "a worksite for a machine resource" may refer to a location where a machine resource works for his or her employer, a place of employment. Such a place can be any office such as an office ranging from a home office to office building or factory. "A worksite for a machine resource" may be also referred to as "a workplace for a machine resource".

If a machine resource may be a humanoid robot, a skill or working history of the humanoid robot may be similar with that of a human resource and associated with this humanoid robot. Accordingly, the aforesaid definitions described for a worksite for a human resource may be also applied to a worksite for a humanoid robot. In other words, a worksite for a humanoid robot may be also regarded as a worksite for a human resource.

As used herein, an "employment agency" may refer to one or more types of organizations, entities, businesses, or individuals that provide a resource or provide a connection to a resource.

As used herein, the term "an unknown word" may refer to a word which is not registered in a dictionary of a system, such as a keyword dictionary.

As used herein, the term "word" may refer to one or more distinct meaningful elements of speech or writing, singularly, or sequentially, such as a phrase or sentence.

As used herein, the term "a repository" may refer to any storage for storing pairs of resource data and skill information associated with the resource data. For example, the pairs of resource data and skill information associated with the resource data may include, but are not limited to, pairs of human resource data or machine resource data and skill information associated with the human resource data or machine resource data or pairs of worksite data and a job description associated with the worksite data. The repository may be, for example, a human machine resource database, a machine resource database, a worksite database, or a combination thereof. The human resource database may have pairs of human resource data and skill information, for example, career information, associated with the human resource data. The machine resource database may have pairs of machine resource data and skill information, for example, career information, specification information or a combination thereof, associated with the machine resource data. The worksite database may have pairs of worksite data and a job description associated with the worksite data.

With reference now to FIG. 1, FIG. 1 is one example of a block diagram depicting a computer system used in accordance with an embodiment of the present invention.

A computer system 101 may be, for example, but is not limited to, a desktop, a laptop, a notebook or a server computer. The server computer may be, for example, but is not limited to, a workstation, a rack-mount type server, a blade type server, a mainframe server, or a cloud server and may run, for example, a hypervisor for creating and running one or more virtual machines. Computer system 101 may comprise one or more central processing units (CPUs) 102 and a main memory 103 connected to a bus 104. CPU 102 may be preferably based on a 32-bit or 64-bit architecture. CPU 102 may be, for example, but is not limited to, the IBM® Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation; "Core i", "Core 2", "Atom", and "Xeon" are trademarks, and "Pentium" and "Celeron" are registered trademarks of Intel Corporation; "Phenom", "Athlon", "Turion", and "Sempron" are trademarks of Advanced Micro Devices, Inc.).

A display 106, such as a liquid crystal display (LCD), may be connected to bus 104 via a display controller 105. Display 106 may be used to display, for management of computer system 101, information on a computer connected to a network via a communication line and information on software running on the computer using an appropriate graphics interface. The display may have a touch screen or a non-touch screen. The display may be for example, but not limited to, an LCD, a plasma display panel (PDP), an organic electro-luminescence (OEL), or a projection type display. A disk 108, such as a hard disk or a solid-state drive (SSD), and a drive 109, such as a compact disc (CD), a digital video disc (DVD), or a Blu-ray disk (BD) drive may be connected to bus 104 via a serial AT attachment (SATA) or integrated drive electronics (IDE) controller 107. Moreover, a keyboard 111 and a mouse 112 may be connected to bus 104 via a keyboard-mouse controller 110 or universal serial bus (USB) (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data, may be stored in disk 108 to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

Drive 109 may be used to install a program, such as the computer program of an embodiment of the present invention, readable from a CD-Read Only Memory (CD-ROM), a DVD-Read Only Memory (DVD-ROM), or a BD to disk 108 or to load any data readable from a CD-ROM, a DVD-ROM, or a BD into main memory 103 or disk 108.

A communication interface 114 may be based on, for example, but is not limited to, the Ethernet® protocol. Communication interface 114 may be connected to bus 104 via a communication controller 113, which physically connects computer system 101 to a communication line 115, and may provide a network interface layer to the TCP/IP communication protocol of a communication function of the operating system of computer system 101. In this case, communication line 115 may be a wired local area network (LAN) environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Hereinafter, the various embodiments of the present invention will be described with reference to the following FIGS. 2A to 2C, FIGS. 3A and 3B, FIGS. 4A and 4B, FIGS. 5A to 5C, FIGS. 6A and 6B, FIGS. 7A to 7C, FIGS. 8A and 8B, FIGS. 9A and 9B, and FIG. 10.

An embodiment of the present invention is based on the following perceptions. Chatbots used by employment agencies for dispatching human resources have a problem in that, if a search query includes an unknown word, the chatbots may answer to the search query as follows: "a meaning of the search query cannot be understand" or "No human resource is found", or the chatbots may answer the search query using words in the search query other than the unknown word, because the dictionary used by the chatbot to parse the words of the query has no such unknown word. This may cause a case that no human resource is presented on the display to the user in response to a search query. To avoid this problem, an advantage of one or more embodiments of invention, is the chatbot may find an unknown word using not only the dictionary, but also by searching on a net or on a repository for storing one or more types of resource data, including, but not limited to, human resource data, machine resource data, worksite data for a human resource, and worksite data for a machine resource.

FIGS. 2A to 2C and FIGS. 3A to 3D each illustrate a block diagram depicting examples of a computer-implemented method for finding "a human resource" and "a machine resource", respectively.

With reference now to FIGS. 2A to 2C, FIGS. 2A to 2C illustrate a block diagram depicting examples of a computer-implemented method for finding "a human resource", in accordance with an embodiment of the present invention.

With reference now to FIG. 2A, FIG. 2A illustrates a display 201, displaying a conversation between a user and a computer system according to an embodiment of the present invention. The user may be a person who wants to find a human resource using the computer system. The computer system may correspond to computer system 101 described in FIG. 1.

Display 201 may be connected to computer system 101 through a display cable or a separate computer to which display 201 is connected. The separate computer may be connected to computer system 101 via a network, such as, but not limited to, an internet or an intranet.

First, the computer system may display, on display 201, a message prompting input of a search query for finding a human resource. For example, the message prompting input of a search query as displayed in balloon 211 is as follows: "We will present human resources in technical fields to you. What type of human resources are you searching for?"

In response to the display of the message in balloon 211, the user may input, using one or more types of input interfaces, including, but not limited to, a keyboard, a mouse, a touch pen or a finger of the user, or speech input method, a search query for finding a human resource. The search query may be an input in a natural language form. For example, the search query input in a natural language form from the user as displayed in balloon 212 is as follows: "Human resources having a capability for cases related to a soft development of Projection TTTYYY."

In response to the input of the search query from the user illustrated in balloon 212, the computer system receives the search query from the user.

One example of the received search query is illustrated in block 221 as follows: "Human resources having a capability for cases related to a soft development of Projection TTTYYY."

The computer system extracts words from the search query illustrated in block 221 using morphological analysis. In one example, by using morphological analysis, the computer system may cut out words and carry out parsing in a received search query. It will be apparent to one skilled in the art that any known computer-implemented methods for morphological analysis can be used for extracting words from the search query. It will be apparent to one skilled in the art that one or more different types of analysis may be implemented to extract words from search queries in one or more different types of forms.

Block 222 shows an example of the extraction of words from the search query. Block 222 shows that the extracted words are as follows: "human resources", "capability", "cases", "related to", "soft development", and "Projection TTTYYY".

After the extraction of the words from the search query, the computer system assigns categories to the words using a dictionary 261. In one example, the one or more extracted words to which categories have been assigned in block 223 may be referred to as "first words". In one example, the categories in dictionary 261 may include, but are not limited to, a category representing a skill of a human resource, a category representing that a word relates to a question in a search query, or a category representing a part of speech.

In one example, the computer system may use dictionary 261 as a keyword dictionary, as explained below.

The keyword dictionary may comprise pairs of word and a category associated with this word. Words in the keyword dictionary may be words relating to the finding of a human resource, such as common or specific words used in search queries. Categories in the keyword dictionary may be categories which can be assigned to a skill word or an inquiry word in words extracted from the search query.

An embodiment of a keyword dictionary is shown in FIG. 8A. A keyword dictionary 801 comprises pairs of word and a category associated with this word. The categories shown in keyword dictionary 801 are "skill" and "inquiry". The category "skill" indicates that a word assigned to this category relates to a skill for a human resource or a machine resource, or a skill to be required for finding a human resource or a machine resource, or a skill to be required for finding a worksite for finding a human resource or a machine resource. The category "inquiry" indicates that a word assigned to this category relates to an inquiry word but not relates to a skill word.

The keyword dictionary may have a synonym for a word in the keyword dictionary. A synonym may be an additional word having the same or nearly the same meaning of the original word.

An example of a synonym is shown in keyword dictionary 801. Keyword dictionary 801 shows that a synonym of "soft development" is a word "software development".

If a particular word in the extracted words in block 222 from the search query is listed, as a synonym, in dictionary 261, such as keyword dictionary 801, the computer system may find a synonym of this particular extracted word from the search query and then replace this particular extracted word from the search query with the found synonym, because the found synonym is commonly listed in dictionary 261 or commonly used compared to the extracted word from the search query. In another embodiment of such replacement, if an extraction dictionary applied for morphological analysis has a synonym, the computer system may replace this particular extracted word from the search query with the found synonym in the process of the morphological analysis, using the extraction dictionary (not shown) used in the morphological analysis.

If a word among the extracted words in block 222 is not found in dictionary 261, the computer system may assign a category "unknown word" to this word. Alternatively, the computer system may not assign any category to this word. In this alternative embodiment, any category is not assigned to this word.

In one example, block 223 illustrates an assignment of categories to the extracted words in block 222, shown as follows: "human resources"—"inquiry"; "capability"—"inquiry"; "cases"—"inquiry"; "related to"—"inquiry"; "software development"—"skill"; and "Projection TTTYYY"—"unknown word". In the example in block 223, the category "unknown word" was assigned to the word "Projection TTTYYY", because dictionary 261 does not include the word "Projection TTTYYY".

The computer system examines whether there is an unknown word in the extracted words or not. If the word to which a category "unknown word" was assigned is found, the computer system chooses this word as an unknown word 224. Alternatively, if the computer system finds a word to which any category was not assigned, the computer system chooses this word as unknown word 224.

With reference now to FIG. 2B, in one example, the computer system may search for an unknown word 226 on a net 281. Net 281 may be a network such as an internet or an intranet. The computer system may use a dictionary on the net, such as internet dictionary or an intranet dictionary.

If unknown word 226 is found on net 281, the computer system may obtain a description on a page on the net on which page the unknown word is found, as seen in a found page 282 shown in FIG. 2B. Page 282 may have a header and a description. The header may comprise a title. The description may be explanatory notes on the header. Page 282 shows the header as a title of the descriptions and a description relating to the title, as similar with a dictionary having a title and a description relating to the title. Page 282 may have the title "Projection TTTYYY" and the description "The game machine sold by ZZZ whose head quarters reside in Tokyo."

The computer system may extract words from the description in page 282 using the aforesaid morphological analysis.

Block 228 illustrates one example of the extraction of words from the description in page 282. Block 228 shows that the extracted words are as follows: "game machine", "sold by" "ZZZ", "head quarters", "reside" and "Tokyo".

After extracting the words from the description, where the extracted words from the description may be referred to as "second words", the computer system assigns categories to the second words using a dictionary 262.

For dictionary 262, the computer system may use dictionary 261, such as the aforesaid keyword dictionary, a system dictionary as explained below, or a combination thereof.

The previous explanation of the keyword dictionary is applicable here.

The system dictionary may comprise pairs of a word and a category associated with this word. Words in the system dictionary may be any word which may be listed on, for example, a language dictionary. Categories in the system dictionary may be categories which can be assigned to, for example, a noun, a proper noun or a verb in words extracted from the description.

One example of a system dictionary is shown in FIG. 8A. A system dictionary 802 comprises pairs of word and a category associated with this word. The categories shown in system dictionary 802 are, for example, "noun", "proper noun" and "verb" and so on.

The system dictionary may have a synonym for a word in the system. A synonym may be an additional word having the same or nearly the same meaning of the original word.

One example of a synonym is shown in keyword dictionary 801. System dictionary 802 shows that a synonym of "soft development" is a word "software development" and a synonym of "tech questions" is a word "technical questions".

If a word extracted from the description in block 228 is listed, as a synonym, in dictionary 262, such as keyword dictionary 802, the computer system may replace the word in extracted from the description in block 228 with a word corresponding to the synonym. This is because the replaced word is commonly listed in dictionary 262 or commonly used compared to the synonym.

An embodiment of the assignment of categories is shown in block 229 as follows: "game machine"—"skill", "ZZZ"—"proper noun", "head quarters"—"noun", and "Tokyo"—"proper noun".

With reference now to FIG. 2C, the computer system finds, among the second words in block 229, a word to which a predetermined category was assigned. The predetermined category may be determined depending on the purpose of the finding of resources. The predetermined category may be a category representing a skill of a human resource.

Let us suppose that the predetermined category is "skill". In this case, the word "game machine" is chosen among the second words in block 229.

Thereafter, the computer system extracts a word, which may be referred to as a "correlation word", having a high correlation with the found word. The correlation may be indicated as a correlation value. The correlation value may be a measure which indicates the degree of strength of relationship of the facet value with a document set selected by the current query in comparison with the other documents in the collection.

Figure 10:
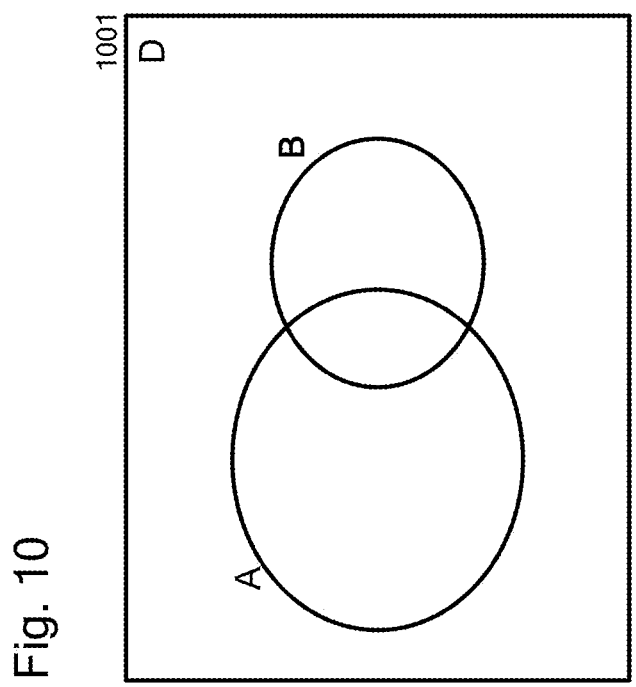
FIG. 10 depicts an example of a correlation value in a test mining used in accordance with an embodiment of the present invention.

A correlation value may be calculated, for example, as seen in FIG. 10.

With reference now to FIG. 10, FIG. 10 shows one example of how to calculate a correlation value.

For example, as illustrated at reference numeral 1001, a correlation value=Actual measurement value/Expectation value.

$$\frac{\#(A \cap B)}{\#A \times \#B \div \#D} = \frac{\#(A \cap B) \div \#D}{(\#A \times \#D) \times (\#B \div \#D)}$$

wherein an actual measurement value is a probability of document that contains both A and B and represented as follow:

$$\frac{\#(A \cap B)}{\#D};$$

and an expectation value is a value obtained by multiplying the probability of document that contains A and the probability of document that contains B together and represented as follows:

$$\frac{\#A}{\#D} \times \frac{\#B}{\#D}$$

With reference now back to FIG. 2C, the correlation word of the word "game machine" is "game programming" according to the correlation value as seen in a block 291. Accordingly, the computer system regards the word "game programming" as a correlation word in a block 231. Multiple words can be chosen as correlation words.

The computer system may find, among the first words, a word to which a category that is the same as the aforesaid predetermined category was assigned, wherein the word may be referred to as "a search word" in table 231. Multiple words may be chosen as search words.

In one example, illustrated in FIG. 2C, the predetermined category is "skill". In this example, the word "software development" is chosen among the first words in block 223.

Thereafter, the computer system finds, from a repository such as human resource database (DB) 271, human resource data using the correlation word "game programming" and the search word "software development" in block 231. The computer system may find human resource data using only the correlation word, only the search word or both of the correlation word and the search word and, then, may give priority to each found human resource data using a mining method as described below.

Human resource database 271 may have pairs of an ID of a human resource (ID), status of the human resource (Status), experience level of the human resource (Experience), an available or preferable working location of the human resource (Location), and career information on the human resource (Career). The status may be represented as follows: 1. Dispatched; 2. Waiting for being dispatched; and 3. Retired. The experience level may be represented as follows: 20, 30, 40, 50, and 60. The location may be represented by one or more location identifiers, such as, but not limited to, a state name, a prefecture name, and a county name. The career information may comprise, for example, but not limited to, job history, an employment record, certificate, educational back ground, major field of study, or a qualification. In additional or alternate examples, ID, status, experience, location and career may include additional or alternate types of information and may be represented by additional or alternate types of representations.

As a result, the computer system obtains one or more human resource data entries from among the entries illustrated at reference numeral 272, from human resource data 271, with or without a value such as a recommended value or a mining analysis value.

When the computer system obtains machine resource data, the computer system may further use a mining method using a correlation related to experience level.

An embodiment of the correlation related to experience level is explained by referring to FIG. 8B.

With reference now to FIG. 8B, table 811 shows the total number of cases in which the numbers for each experience level are summed up. In one example, table 812 shows career field contains both "game machine (skill)" and "software development (skill)". In one example, the correlation related to experience level in table 812 is calculated as follows: the ratio of assumed numerical value and an actual numerical value calculated based on the entire ratio. In the example, the aforesaid correlation related to experience level in table 812 is as follows: 50/100×(1000/4000)=2.0

The computer system may give higher priority to the word having a high score. Accordingly, if multiple words are obtained, the order of the words may be sorted according to the priority.

An embodiment of the obtained human resource data is shown in box 232 as follows: "Prefix XXX" ( %); "Prefix YYY" ( %); . . . ".

Thereafter, the computer system or the display presents the found human resource data to the user, as seen in a balloon 213. In one example, balloon 213 is illustrated as follows:

"The following persons are recommended:
 Prefix XXX ( %)
 Prefix YYY ( %)
 . . . ".

The computer system may list the found human resource data according to the order of priority. Thereafter, the computer system may present the listed human resource data to the user. Alternatively, the display displays the listed human resource data to the user.

If the user wants to know more details about the presented human resource, the user can click the characters of the presented in human resource data on display 203.

In response to the click, the computer system may obtain detailed information on the presented human resource data from human resource database 271 in order to display the information on display 203.

According to the block diagram described in FIGS. 2A to 2C, an advantage of one or more embodiments of the present invention is that the computer system may the aforesaid correlation word instead of an unknown word and, therefore, may present a suitable human resource in response to a natural language input that even contains one or more unknown words.

With reference now to FIGS. 3A to 3D, FIGS. 3A to 3D illustrate a block diagram depicting a computer-implemented method of finding a machine resource, in accordance with an embodiment of the present invention.

With reference now to FIG. 3A, FIG. 3A illustrates a display 301 managing a conversation between a user and a computer system according to an embodiment of the present invention. The user may be a person who wants to find a machine resource using the computer system. The computer system may correspond to computer system 101 described in FIG. 1.

Display 301 may be connected to computer system 101 through a display cable or a separate computer to which display 301 is connected. The separate computer may be connected to computer system 101 via a network such as an internet or an intranet.

First, the computer system may display, on display 301, a message prompting input of a search query for finding a machine resource. The search query may be an input in a natural language form. For example, the message prompting input of a search query for finding a machine resource is displayed in balloon 311 as follows: "We will present machine resources in technical fields to you. What type of machine resources are you searching for?"

In response to the display of the message in balloon 311, the user may input, using a keyboard, a mouse, a touch pen or a finger of the user, or speech input method, a search query for finding a machine resource. In one example, the search query from the user is displayed in balloon 312 as follows: "Machine resources having a capability for answering technical questions relating to Projection TTTYYY."

In response to the input of the search query from the user, the computer system receives the search query from the user.

One example of the received search query is shown in block 321 as follows: "Machine resources having a capability for answering technical questions relating to Projection TTTYYY."

The computer system extracts words from the search query in block 321 using morphological analysis. In one example, by using morphological analysis, the computer system may cut out words and carry out parsing in a received search query. It will be apparent to one skilled in the art that any known computer-implemented methods for morphological analysis can be used for extracting words from the search query. It will be apparent to one skilled in the art that one or more different types of analysis may be implemented to extract words from search queries in one or more different types of forms.

In one example, the extraction of words from the search query in block 321 is shown in block 322. Block 322 shows that the extracted words are as follows: "machine resources", "capability", "answering", "technical questions", and "Projection TTTYYY".

After the extraction of the words from the search query, the computer system assigns categories to the words using a dictionary 361. In one example, the one or more extracted words to which categories have been assigned in block 323 may be the one or more first words.

The computer system may use dictionary 361 as a keyword dictionary as explained below. The keyword dictionary may comprise pairs of word and a category associated with this word. Words in the keyword dictionary may be words relating to the finding of a machine resource, for example common or specific words used in search queries. Categories in the keyword dictionary may be categories which can be assigned to a skill word or an inquiry word in words extracted from the search query. The aforesaid embodiment of the keyword dictionary is also applicable to dictionary 361.

If a word among the extracted words in block 322 is not found in dictionary 361, the computer system may assign a category "unknown word" to this word. Alternatively, the computer system may not assign any category to this word. In this alternative embodiment, any category is not assigned to this word.

In one example, block 323 illustrates an assignment of categories to the extracted words in block 323, shown as follows: "machine resources"—"inquiry"; "capability"—"inquiry"; "answering"—"inquiry"; "technical questions"—"skill"; and "Projection TTTYYY"—"unknown word". In the example in block 323, the category "unknown word" was assigned to the word "Projection TTTYYY", because dictionary 361 does not have the word "Projection TTTYYY".

The computer system examines whether there is an unknown word in the extracted words or not. If the word to which a category "unknown word" was assigned is found, the computer system chooses this word as an unknown word 324. Alternatively, if the computer system finds a word to which any category was not assigned, the computer system chooses this word as unknown word 324.

Figure 3B:
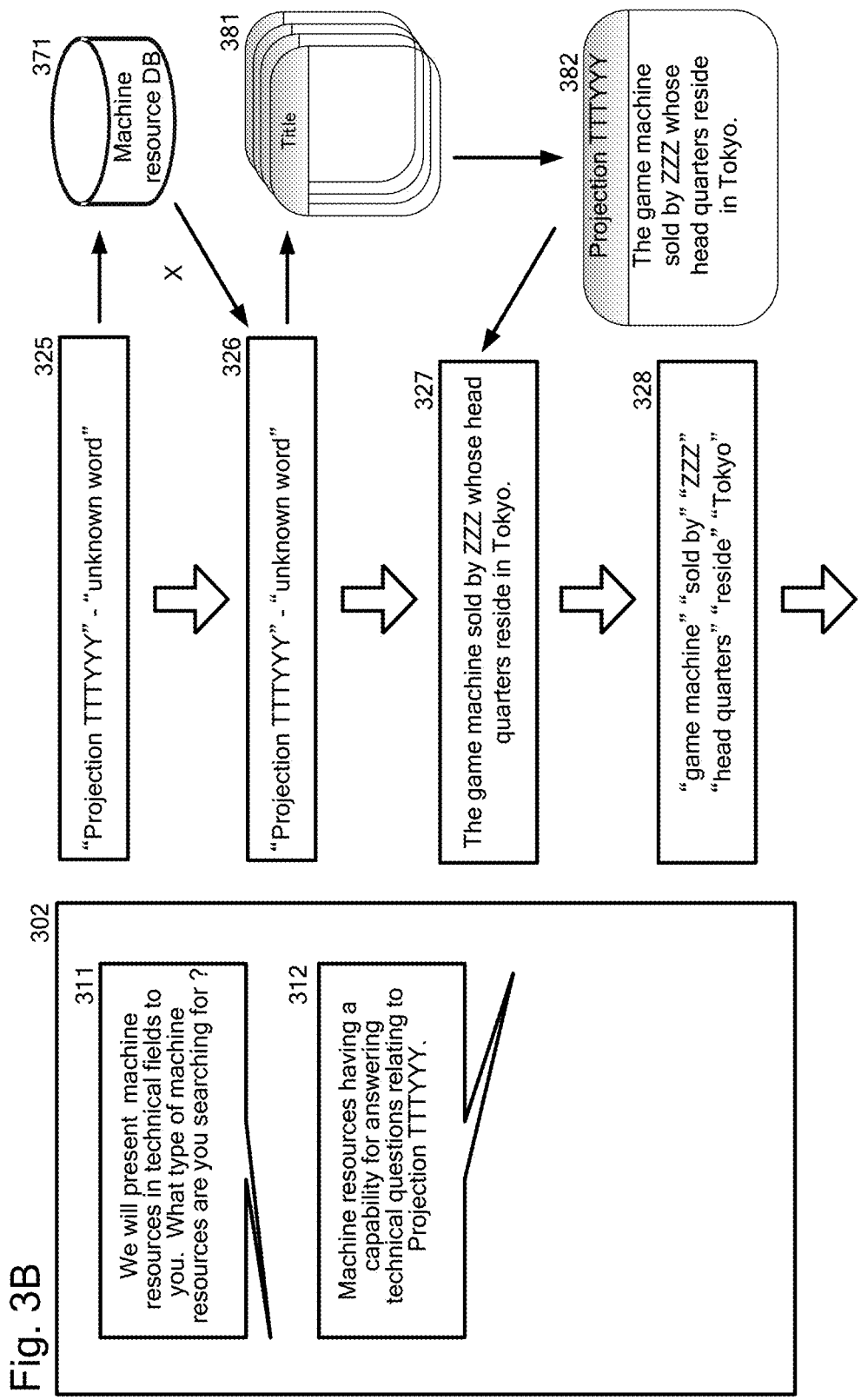

With reference now to FIG. 3B, in one example, the computer system may search for unknown word 325 on a repository such as a machine resource database 371. In one example, machine resource database 371 may have pairs of machine resource data and skill information associated with the machine resource data.

If unknown word 325 is not found on machine resource database 371, the computer system then searches for unknown word 326 on a net 381. Net 381 may be a network such as an internet or an intranet. Net 381 may be a dictionary on the network, such as an internet dictionary or an intranet dictionary.

A process performed if unknown word 325 is found on machine resource database 371 will be separately explained by referring to FIG. 3D below.

If unknown word 326 is found on net 381, the computer system obtains a description on a page on the net on which page the unknown word is found, as seen in the found page 382 shown in FIG. 3B. Page 382 may have header and a description. The header may comprise a title. The description may be explanatory notes on the header. Page 382 shows the header as a title of the descriptions and a description relating to the title. Page 382 may have the title "Projection TTTYYY" and the description "The game machine sold by ZZZ whose head quarters reside in Tokyo."

The computer system may extract words from the description in page 382 using the aforesaid morphological analysis.

Block 328 illustrates one example of the extraction of words from the description in page 382. Block 328 shows that the extracted words are as follows: "game machine", "sold by" "ZZZ", "head quarters", "reside" and "Tokyo".

After extracting the words from the description, where the one or more extracted words from the description may represent the one or more second words, the computer system may assign categories to the second words using a dictionary 362.

For dictionary 362, the computer system may use dictionary 361, such as the aforesaid keyword dictionary, the aforesaid system dictionary as explained below, or a combination thereof. If the dictionary comprises the aforesaid keyword dictionary and the aforesaid system dictionary, the assignment of categories to the words using the dictionary is done in the order of the keyword dictionary and then the system dictionary.

The aforesaid explanation of the keyword dictionary and the system dictionary is applicable here.

With reference now to FIG. 3C, one example of the assignment of categories is shown in block 329 in FIG. 3C as follows: "game machine"—"skill", "ZZZ"—"proper noun", "head quarters"—"noun", and "Tokyo"—"proper noun".

The computer system finds, among the second words in block 329, a word to which a predetermined category was assigned. The predetermined category may be determined depending on the purpose of the finding of resources. The predetermined category may be a category representing a skill of a machine resource.

In one example, as illustrated in FIG. 3C, the predetermined category is "skill". In the example in FIG. 3C, the word "game machine" is chosen among the second words in block 329.

Thereafter, the computer system extracts a word which may represent the correlation word, having a high correlation with the found word. The explanation of the correlation is applicable here.

With reference now back to FIG. 3C, the correlation word of the word "game machine" is "game programming" according to the correlation value as seen in table 391. Accordingly, the computer system regards the word "game programming" as a correlation word in block 331. Multiple words can be chosen as correlation words, if multiple words as correlation words exist.

The computer system may find, among the first words, a word to which a category that is the same as the aforesaid predetermined category was assigned, referred to as "a search word" in block 331. Multiple words may be chosen as search words, if multiple words as search words exist.

In one example, illustrated in FIG. 3C, the predetermined category is "skill". In this case, the word "software development" is chosen among the first words in block 323.

Thereafter, the computer system finds, from a repository such as machine resource database (DB) 371, machine resource data using the correlation word "game programming" and the search word "software development" in block 331. The computer system may find human resource data using only the correlation word, only the search word and both of the correlation word and the search word and, then, gives priority to each found human resource data using a mining method as described below.

Machine resource database 371 may have pairs of an ID of a machine resource (ID), status of the machine resource (Status), and specification information on the machine resource (Specification). The status may be represented as follows: 1. Dispatched; 2. Waiting for being dispatched; and 3. Under repair or scrapped. The specification information may comprise, for example, but not limited to, job history, performance, or fee for sale or rental.

As a result, the computer system obtains one or more machine resource data entries from among the entries illustrated at reference numeral 372, from machine resource database 371, with or without a value such as a recommended value or a mining analysis value.

In one example, a career field may contain both "game machine (skill)" and "software development (skill)"

When the computer system obtains machine resource data, the computer system may further use a mining method using a correlation related to experience levels.

The aforesaid example of the correlation related to experience levels in the example in FIGS. 2A-2C is applicable here in the example in FIGS. 3A-3D.

With reference now back to FIG. 3C, an embodiment of the obtained machine resource data is shown in block 332 as follows: "#004" ( %); "#002" ( %)"; . . . ".

Thereafter, the computer system or the display presents the found machine resource data to the user, as seen in balloon 313. In one example, balloon 313 is illustrated as follows:
"The following bots are recommended:
ID #00C ( %)
ID #00B ( %)
. . . ".

The computer system may list the found machine resource data according to the order of priority. The computer system may present the listed human resource data to the user. Alternatively, the display may display the listed human resource data to the user.

If the user wants to know more details about the presented machine resource, the user can click the characters of the presented machine resource data on display 303.

In response to the click, the computer system may obtain detailed information on the presented machine resource data from machine resource database 371 in order to display the information on display 303.

With reference now to FIG. 3D, in one example, machine resource database 391 is used instead of machine resource database 371 and machine resource database 391 has the word "Projection TTTYYY" in the item "Specification".

If the unknown word is found on machine resource database 391, the computer system then finds, from machine resource database 391, machine resource data using the unknown word or the unknown word and the aforesaid search word.

As a result, the computer system obtains one or more machine resource data entries from among the entries illustrated at reference numeral 373 in machine resource database 391, with or without a value such as a recommended value or a mining analysis value.

One example of the obtained machine resource data is shown in block 341 as follows: "#00C" ( %); "#00B" ( %)"; . . . ".

Thereafter, the computer system or the display presents the found machine resource data to the user, as seen in balloon 314. One example of balloon 314 is as follows:

"The following bots are recommended:
ID #00C ( %)
ID #00B ( %)
. . . "

The computer system may propose that the unknown word be added to dictionary 361 if the unknown word is in the repository, but not currently in dictionary 361.

According to the examples in the block diagrams described in FIGS. 3A to 3C, an advantage of one or more embodiments of the present invention is that where the unknown word is not found on the repository, such as a machine resource database 371, but is found on the net, the computer system may use the aforesaid correlation word instead of an unknown word and, therefore, may present a suitable machine resource in response to a natural language input that even contains an unknown word.

According to the block diagram described in FIGS. 3A, 3B and 3D, an advantage of the one or more embodiments of the present invention is that if the unknown word is found on the repository, the computer system may, using this unknown word, present a further suitable machine resource in response to a natural language input that even contains an unknown word.

An embodiment of the examples described in FIGS. 2A to 2C and FIGS. 3A to 3D may be combined to find either a human resource data or a machine resource data from a repository that comprises pairs of human resource data and skill information associated with the human resource data together with pairs of machine resource data and skill information associated with the machine resource data.

FIGS. 4A and 4B and FIGS. 6A and 6B illustrate different high level logic flowcharts each depicting examples of a process and computer program for finding a human or machine resource. FIGS. 5A to 5C and FIGS. 7A to 7C illustrate different high level logic flowcharts each depicting examples of a process and computer program for finding a worksite for a human or machine resource.

In these flowcharts described in FIGS. 4A and 4B, FIGS. 5A to 5C, FIGS. 6A and 6B and FIGS. 7A to 7C, the subject of steps may be a computer system such as computer system 101 described in FIG. 1.

With reference now to FIGS. 4A and 4B, FIGS. 4A and 4B are flowcharts depicting a process of finding a human or machine resource, in accordance with an embodiment of the present invention.

At step 401, the computer system starts the process mentioned above.

At step 402, the computer system displays, on a display, a message prompting input of a search query from a user. The search query may be for finding a human or machine resource.

At step 403, the computer system receives a search query from a user for finding a human or machine resource.

At step 404, the computer system extracts words from the search query using morphological analysis.

At step 405, the computer system assigns categories to the words using a dictionary 461, such as the aforesaid keyword dictionary. The one or more words to which categories are assigned may represent the one or more first words.

At step 406, the computer system examines whether there is an unknown word in the extracted words. At step 406, if there is an unknown word in the extracted words, the computer system proceeds to step 411. Meanwhile, if there are not any unknown words in the extracted words, the computer system proceeds to step 407.

At step 407, the computer system finds, from a repository 471, such as a human resource database or a machine resource database, human or machine resource data using the first word to which a predetermined category was assigned. If there are multiple first words, the multiple first words are used to find human or machine resource data.

At step 411, the computer system searches for the unknown word on a net, such as an internet or intranet.

At step 412, the computer system examines whether the unknown word is found on the net. The net may be a network such as an internet or an intranet. The computer system may use a dictionary on the net, such as internet dictionary or an intranet dictionary. At step 412, if the unknown word is found on the net, the computer system proceeds to step 413. Meanwhile, if the unknown word is not found on the net, the computer system proceeds to the aforesaid step 407.

At step 413, the computer system obtains a description on a page on the net on which page the unknown word is found. The page may have a header and a description. The header may comprise a title. The description may be explanatory notes on the header.

At step 414, the computer system extracts words from the description using morphological analysis. The morphological analysis used in step 414 may be the same or different morphological analysis used in step 404.

At step 415, the computer system assigns, using a dictionary 462, categories to the words extracted from the description. The one or more words to which categories are assigned may represent the one or more second words. The dictionary used in step 415 may be the aforesaid keyword dictionary or the aforesaid keyword dictionary and system dictionary.

At step 416, the computer system finds, among the second words, a word to which a predetermined category was assigned and then extracting a word having a high correlation with the found word, which may present a correlation word. The predetermined category is a category representing a skill of a human or machine resource. Further, the computer system finds, among the one or more first words, a word to which a category which is the same as the aforesaid predetermined category was assigned, which may represent a search word.

At step 417, the computer system finds, from a repository 471, human or machine resource data using the correlation word and the search word. Repository 471 may be the aforesaid human resource database or the aforesaid machine resource database.

At step 418, the computer system lists the found human or machine resource data so as to enable the found human or machine resource data to be presented on the display to the user. Thereafter, the computer system presents the listed human or machine resource data to the user. Alternatively, the display displays the listed human or machine resource data to the user.

At step 419, the computer system terminates the process mentioned above.

According to the flow chart diagram described in FIGS. 4A and 4B, the computer system uses the aforesaid correlation word instead of an unknown word and, therefore, can present a suitable human or machine resource to a natural language input that even contains an unknown word.

Figure 5A:
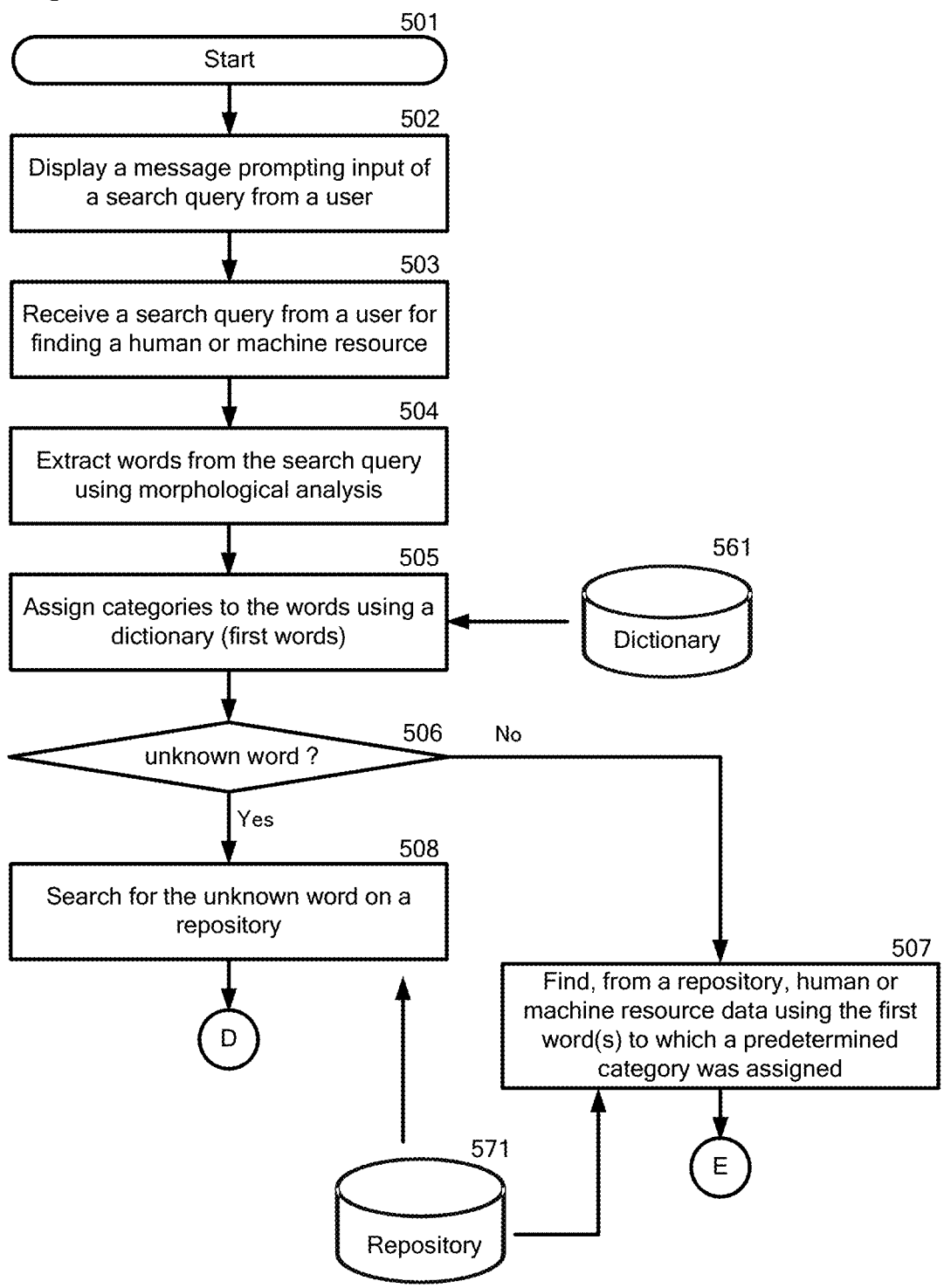
Figure 5C:
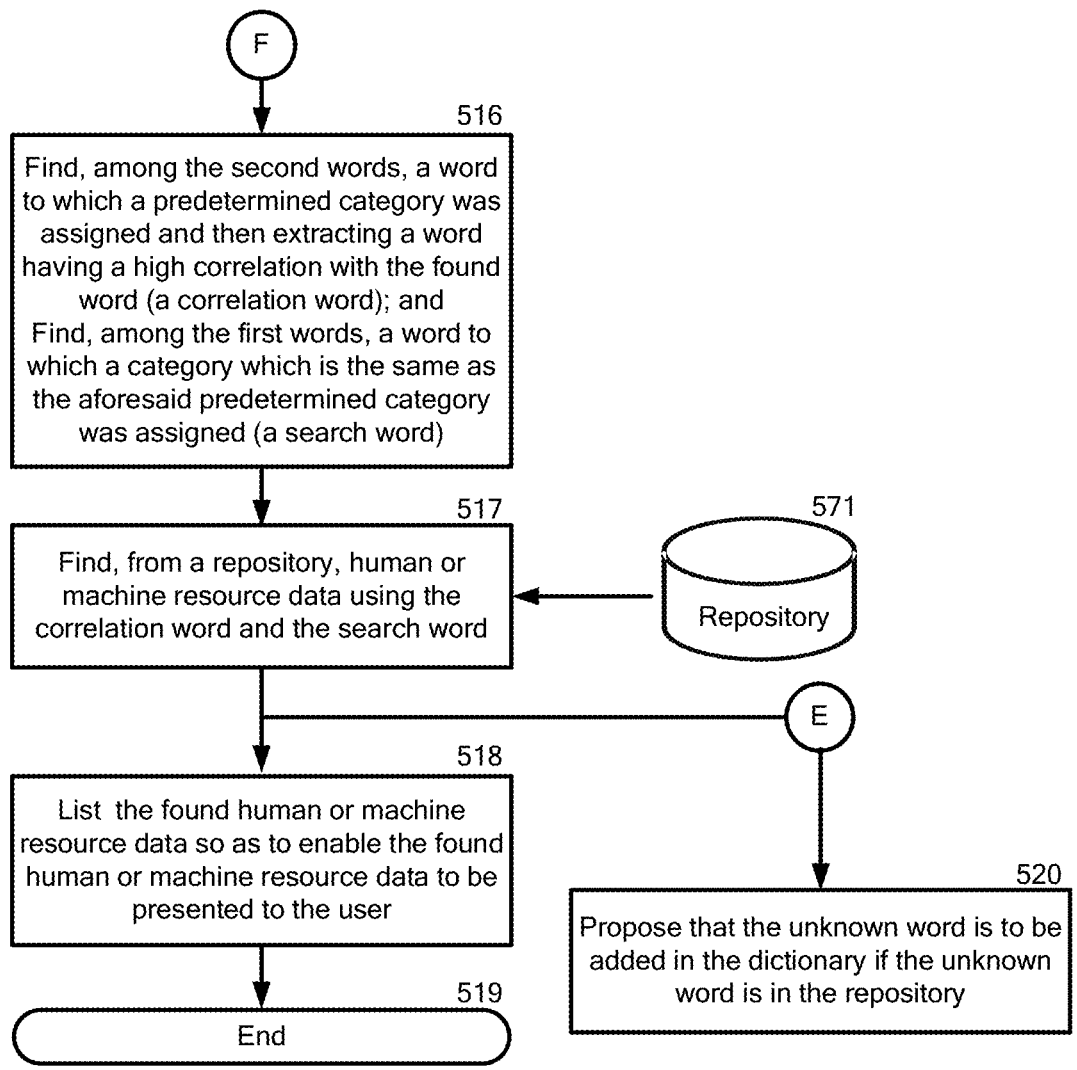

With reference now to FIGS. 5A to 5C, FIGS. 5A to 5C are flowcharts depicting a process of finding a human or machine resource, in accordance with one embodiment of the present invention.

At step 501, the computer system starts the process mentioned above.

Steps 502 to 507 may correspond to steps 402 to 407, respectively. Accordingly, detailed explanations of steps 502 to 507 are omitted here.

At step 508, the computer system searches for the unknown word on repository 571 such as the aforesaid human resource database or machine resource database.

At step 509, the computer system examines whether the unknown word is found on repository 571. If a unknown word is found on repository 571, the computer system proceeds to step 510. Meanwhile, if the unknown word is not found on repository 571, the computer system proceeds to step 511.

At step 510 after the aforesaid step 509, the computer system finds, from repository 571, human or machine resource data using the unknown word which was found on the repository or this unknown word and the one or more first words to which a predetermined category was assigned.

Steps 511 and 512 may correspond to steps 411 and 412, respectively. Accordingly, detailed explanations of steps 511 and 512 are omitted here.

At step 510 after the aforesaid step 512, the computer system finds, from repository 571, human or machine resource data using the one or more first words to which a predetermined category was assigned.

Steps 513 to 518 may correspond to steps 413 to 418, respectively. Accordingly, detailed explanations of steps 513 to 518 are omitted here.

At step 519, the computer system terminates the process mentioned above.

In an optional step 520, the computer system may propose that the unknown word is to be added in the dictionary if the unknown word is in the repository such as in step 509. Therefore, later in this step 520, the dictionary has the aforesaid unknown word as the known word registered in the dictionary.

According to the flow chart diagram described in FIGS. 5A to 5C, the computer system uses the aforesaid correlation word instead of an unknown word and, therefore, can present a suitable human or machine resource in response to a natural language input that even contains an unknown word.

With reference now to FIGS. 6A and 6B, FIGS. 6A and 6B are flowcharts depicting one example of a process of finding a worksite for a human or machine resource, in accordance with an embodiment of the present invention.

At step 601, the computer system starts the process mentioned above.

At step 602, the computer system displays, on a display, a message prompting input of a search query from a user. The search query may be for finding a worksite for a human or machine resource.

At step 603, the computer system receives a search query from a user for finding a worksite for a human or machine resource.

At step 604, the computer system extracts words from the search query using morphological analysis.

At step 605, the computer system assigns categories to the words using a dictionary 661, such as the aforesaid keyword dictionary. The one or more words to which categories are assigned may represent the one or more first words.

At step 606, the computer system examines whether there is an unknown word in the extracted words. If there is an unknown word in the extracted words, the computer system proceeds to step 608. Meanwhile, if there is not an unknown word in the extracted words, the computer system proceeds to step 607.

At step 607, the computer system finds, from a repository 671, such as a worksite database, a worksite data using the first word to which a predetermined category was assigned. If there are multiple first words, the multiple first words are used to find a worksite data.

At step 611, the computer system searches for the unknown word on a net, such as an internet or intranet.

At step 612, the computer system examines whether the unknown word is found on the net. The net may be a network such as an internet or an intranet. The computer system may use a dictionary on the net, such as internet dictionary or an intranet dictionary. If the unknown word is found on the net, the computer system proceeds to step 613. Meanwhile, if the unknown word is not found on the net, the computer system proceeds to the aforesaid step 607.

At step 613, the computer system obtains a description on a page on the net on which page the unknown word is found. The page may have a header and a description. The header may comprise a title. The description may be explanatory notes on the header.

At step 614, the computer system extracts words from the description using morphological analysis. The morphological analysis used in step 614 may be the same or different morphological analysis used in step 604.

At step 615, the computer system assigns, using a dictionary 662, categories to the words extracted from the description. The one or more words to which categories are assigned may represent the one or more second words. The dictionary used in step 615 may be the aforesaid keyword dictionary or the aforesaid keyword dictionary and system dictionary.

At step 616, the computer system finds, among the second words, a word to which a predetermined category was assigned and then extracting a word having a high correlation with the found word, which may represent a correlation word. The predetermined category is a category representing a skill to be required for a worksite for a human or machine resource. Further, the computer system finds, among the first words, a word to which a category that is the same as the aforesaid predetermined category was assigned, which may represent a search word.

At step 617, the computer system finds, from repository 671, a worksite data using the correlation word and the search word. Repository 671 may be the aforesaid worksite database.

At step 618, the computer system lists the found human or machine resource data so as to enable the found human or machine resource data to be presented on the display to the user. Thereafter, the computer system presents the listed human resource data to the user. Alternatively, the display displays the listed human resource data to the user.

At step 619, the computer system terminates the process mentioned above.

According to the flow chart diagram described in FIGS. 6A and 6B, the computer system uses the aforesaid correlation word instead of an unknown word and, therefore, can present a suitable worksite to a natural language input that even contains an unknown word.

Figure 7A:
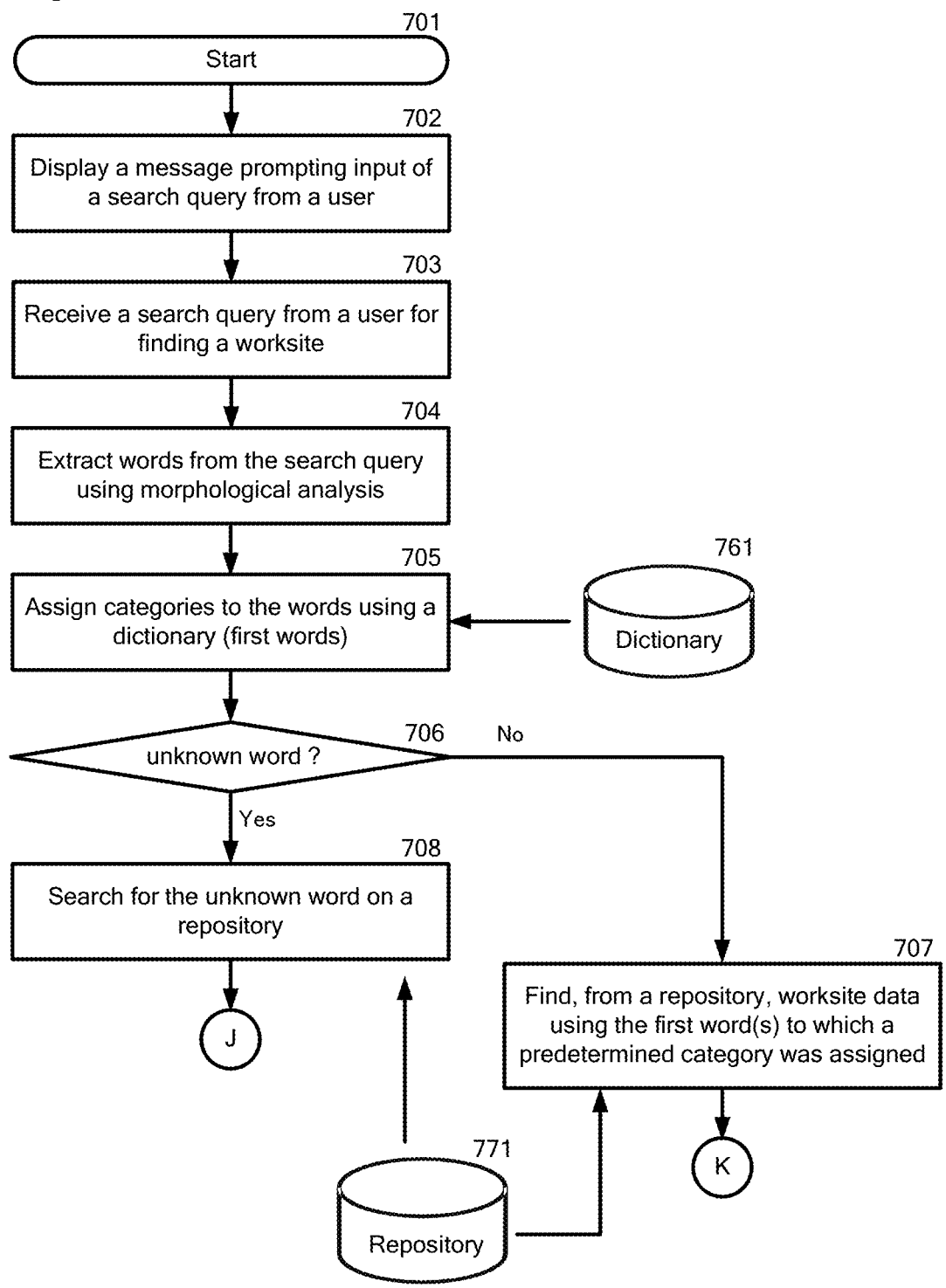
Figure 7C:
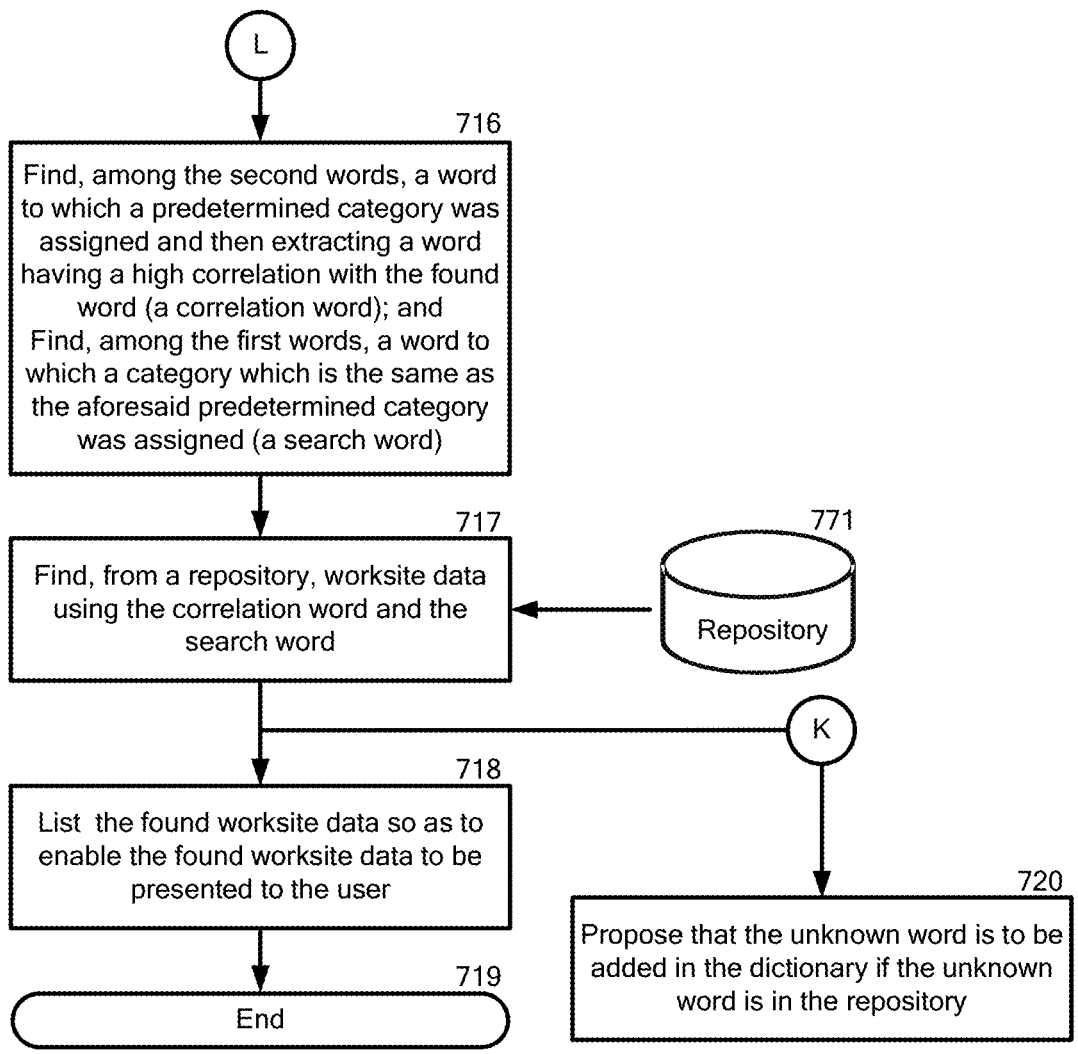

With reference now to FIGS. 7A to 7C, FIGS. 7A to 7C are flowcharts depicting one example of a process of finding a worksite for a human or machine resource, in accordance with another embodiment of the present invention.

At step 701, the computer system starts the process mentioned above.

Steps 702 to 707 may correspond to steps 602 to 607, respectively. Accordingly, detailed explanations of steps 702 to 707 are omitted here.

At step 708, the computer system searches for the unknown word on a repository 771 such as the aforesaid worksite database.

At step 709, the computer system examines whether the unknown word is found on repository 771. If the unknown word is found on repository 771, the computer system proceeds to step 710. Meanwhile, if the unknown word is not found on repository 771, the computer system proceeds to step 711.

At step 710 after the aforesaid step 709, the computer system finds, from repository 771, worksite data using the unknown word which was found on the repository or this unknown word and the one or more first words to which a predetermined category was assigned.

Steps 711 and 712 may correspond to steps 611 and 612, respectively. Accordingly, detailed explanations of steps 711 and 712 are omitted here.

At step 710 after the aforesaid step 712, the computer system finds, from repository 771, human or machine resource data using the one or more first words to which a predetermined category was assigned.

Steps 713 to 718 may correspond to steps 613 to 618, respectively. Accordingly, detailed explanations of steps 713 to 718 are omitted here.

At step 719, the computer system terminates the process mentioned above.

In an optional step 720, the computer system may propose that the unknown word is to be added in the dictionary if the unknown word is in repository, such as in step 709. Therefore, later in this step 720, the dictionary has the aforesaid unknown word as the known word registered in the dictionary.

According to the flow chart diagram described in FIGS. 7A to 7C, the computer system uses the aforesaid correlation word instead of an unknown word and, therefore, can present a suitable worksite to a natural language input that even contains an unknown word.

Figure 9A:
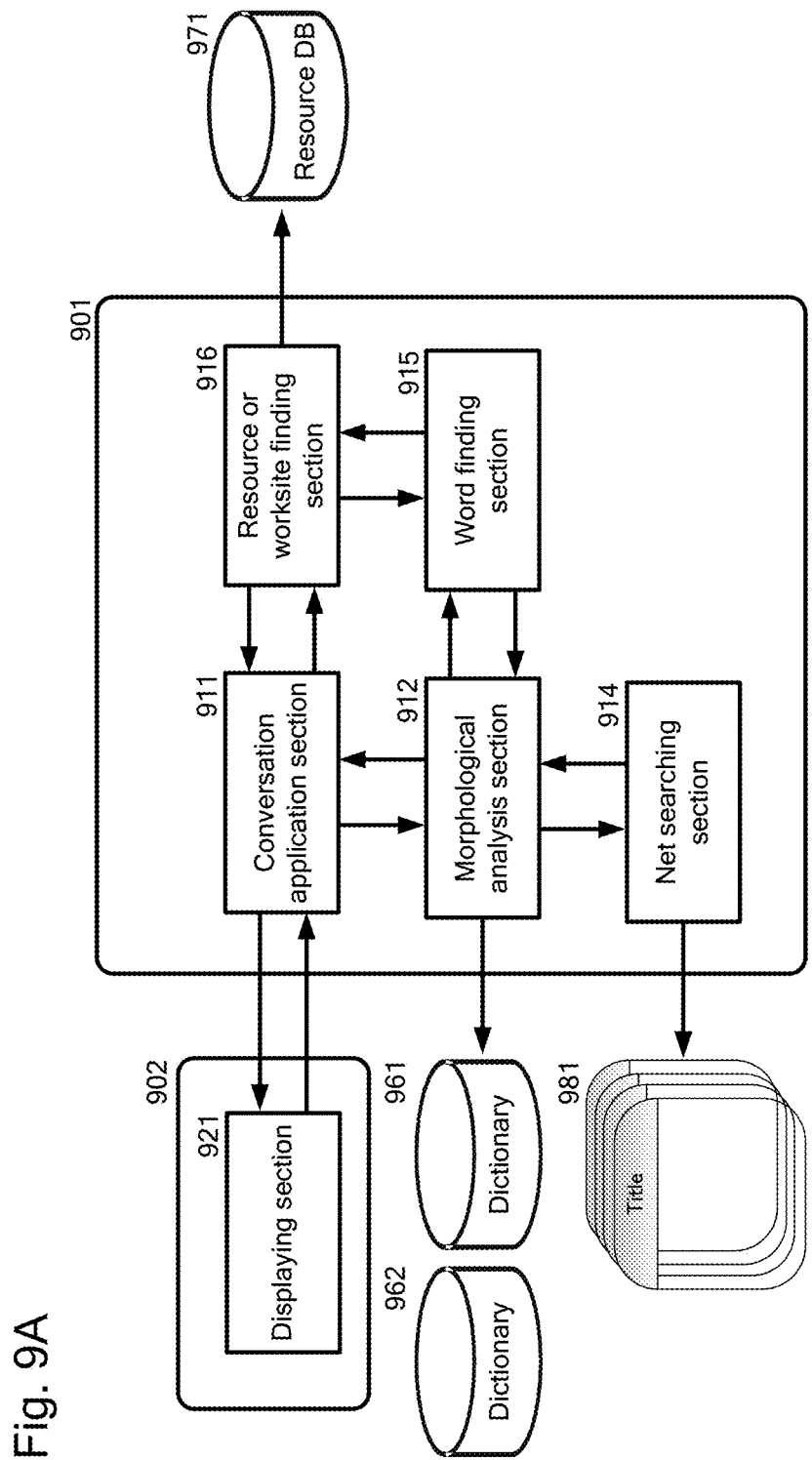
FIG. 9A is an overall functional block diagram depicting one example of a computer system hardware in relation to the process of FIGS. 4A and 4B and FIGS. 6A and 6B, in accordance with an embodiment of the present invention.
Figure 9B:
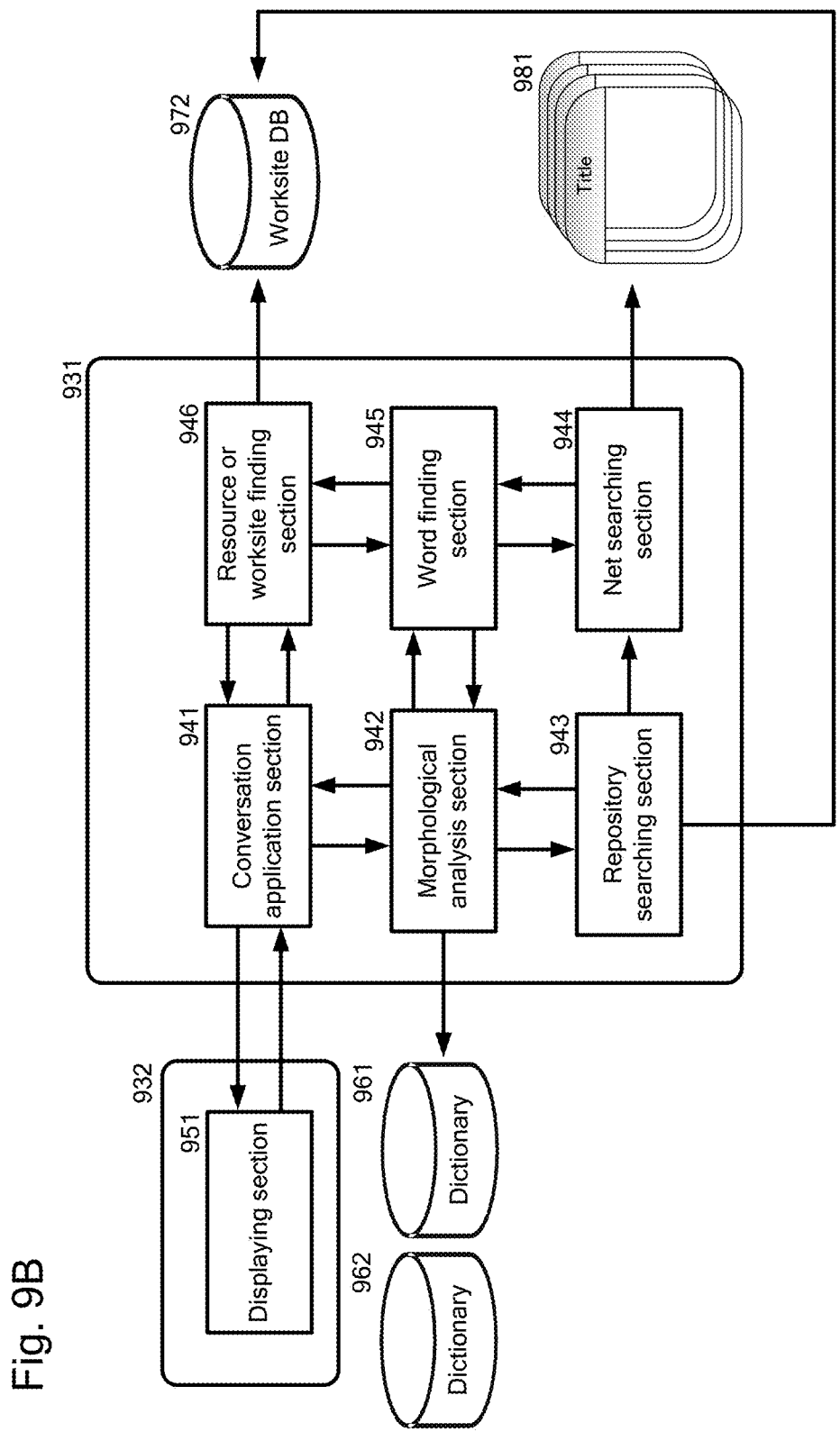
FIG. 9B is an overall functional block diagram of depicting one example of a computer system hardware in relation to the process of FIGS. 5A to 5C and FIGS. 7A to 7C, in accordance with an embodiment of the present invention.

FIGS. 9A and 9B show one example of a different overall functional block diagram in accordance with an embodiment of the present invention.

With reference now to FIG. 9A, FIG. 9A is an overall functional block diagram of depicting one example of a computer system hardware in relation to the process of FIGS. 4A and 4B and FIGS. 6A and 6B, in accordance with an embodiment of the present invention.

In one example, a computer system 901 may correspond to computer system 101 described in FIG. 1. In one example, a display 902 may correspond to display 201 described in FIG. 2A or display 301 described in FIG. 3A.

Computer system 901 may comprise a conversation application section 911, a morphological analysis section 912, a net searching section 914, a word finding section 915, and a resource or worksite finding section 916.

Conversation application section 911 may receive a search query from a user for finding a resource, such as, but not limited to, a human resource, machine resource, a worksite for a human resource, or a worksite for a machine resource.

Conversation application section 911 may perform step 403 described in FIG. 4A and step 603 described in FIG. 6A.

A morphological analysis section 912 may extract words from the search query using morphological analysis and assigns categories to the words using a dictionary, wherein the one or more words assigned categories may represent the one or more first words. Morphological analysis section 912 further extracts words from the description using morphological analysis and assigns, using a dictionary, categories to the words extracted from the description, wherein the one or more words extracted from the description and assigned categories may represent the one or more second words.

Morphological analysis section 912 may perform steps 404 to 406 and steps 414 to 415 described in FIG. 4A and FIG. 4B, respectively, and steps 604 to 606 and steps 614 to 615 described in FIG. 6A and FIG. 6B, respectively.

A net searching section 914 may search for the unknown word on a net. Net searching section 914 obtains a description on a page on the net on which page the unknown word is found, if the unknown word is found on the net, Net searching section 914 may perform steps 411 to 412 and step 413 described in FIG. 4A and FIG. 4B, respectively, and steps 611 to 612 and step 613 described in FIG. 6A and FIG. 6B, respectively.

A word finding section 915 may find, among the second words, a word to which a predetermined category was assigned and then extract a word having a high correlation with the found word, wherein the extracted word may represent a correlation word, and finds, among the first words, a word to which a category that is the same as the aforesaid predetermined category was assigned, wherein the word is referred to as a search word.

Word finding section 915 may perform step 416 described in FIG. 4A and step 616 described in FIG. 6A.

The resource or worksite finding section 916 may find, from a repository, human resource data, machine resource data, or worksite data using the correlation word and the search word.

The resource or worksite finding section 916 may perform step 407 and step 417 described in FIG. 4A and FIG. 4B, respectively, and step 607 and step 617 described in FIG. 6A and FIG. 6B, respectively.

Display 902 may comprise a display section 921.

Display section 921 may list the found human resource data or machine resource data or worksite data and may display the listed found human resource data, machine resource data, or worksite data on the display.

Display section 921 may perform step 402 and step 418 described in FIG. 4A and FIG. 4B, respectively, and step 602 and step 618 described in FIG. 6A and FIG. 6B, respectively.

With reference now to FIG. 9B, FIG. 9B is an overall functional block diagram depicting one example of a computer system hardware in relation to the process of FIGS. 5A to 5C and FIGS. 7A to 7C, in accordance with an embodiment of the present invention.

A computer system 931 may correspond to computer system 101 described in FIG. 1. A display 932 may correspond to display 201 described in FIG. 2A or display 301 described in FIG. 3A.

Computer system 931 may comprise a conversation application section 941, a morphological analysis section 942, a repository searching section 943, a net searching section 944, a word finding section 945 and a resource or worksite finding section 946.

Conversation application section 941 may receive a search query from a user for finding a resource such as, but not limited to, a human resource, machine resource, a worksite for a human resource, or a worksite for a machine resource.

Conversation application section 941 may perform step 503 described in FIG. 5A and step 703 described in FIG. 7A.

Morphological analysis section 942 may extract words from the search query using morphological analysis and assign categories to the words using a dictionary, wherein the one or more words assigned categories may represent the one or more first words. Morphological analysis section 942 may further extract words from the description using morphological analysis and assign, using a dictionary, categories to the words extracted from the description, wherein the one or more words extracted from the description and assigned categories may represent the one or more second words.

Morphological analysis section 942 may perform steps 504 to 506 and step 514 to 515 described in FIG. 5A and FIG. 5B, respectively, and steps 704 to 706 and steps 714 to 715 described in FIG. 7A and FIG. 7B, respectively.

Repository searching section 943 may search for the unknown word on the repository, wherein the repository has pairs of human or machine resource data and skill information associated with the human or machine resource data or pairs of worksite data and a job description associated with the worksite data, prior to the searching for the unknown word on a net if there is an unknown word in the extracted words.

Repository searching section 943 may perform step 508 and step 509 described in FIG. 5A and FIG. 5B, respectively, and step 708 and step 709 described in FIG. 7A and FIG. 7B, respectively.

Net searching section 944 may search for the unknown word on a net. Net searching section 944 may obtain a description on a page on the net on which page the unknown word is found, if the unknown word is found on the net, Net searching section 944 may perform steps 511 to 513 described in FIG. 5B and steps 711 to 713 described in FIG. 7B.

Word finding section 945 may find, among the second words, a word to which a predetermined category was assigned and then extracts a word having a high correlation with the found word, wherein the extracted word may represent a correlation word, and finds, among the first words, a word to which a category that is the same as the aforesaid predetermined category was assigned, wherein the word may represent a search word.

Word finding section 945 may perform step 516 described in FIG. 5C and step 716 described in FIG. 7C.

Resource or worksite finding section 946 may find, from a repository, human or machine resource data or worksite data using the correlation word and the search word.

Resource or worksite finding section 946 may perform step 507, step 510 and step 517 described in FIG. 5A, FIG. 5B and FIG. 5C, respectively, and step 707, step 710 and step 717 described in FIG. 7A, FIG. 7B and FIG. 7C, respectively.

In one example, a display 932 may comprise a display section 951.

Display section 951 may list the found human or machine resource data or worksite data and may display the listed found human or machine resource data or worksite data on the display.

Display section 951 may perform step 502 and step 518 described in FIG. 5A and FIG. 5C, respectively, and step 702 and step 718 described in FIG. 7A and FIG. 7C, respectively.

The present invention may be a computer-implemented method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of computer-implemented methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, computer-implemented methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:

receiving, by a computer, a search query from a user for finding a resource;

extracting, by the computer, one or more words from the search query using morphological analysis;

assigning, by the computer, at least one first category to at least one first word of the one or more words using a dictionary, wherein the dictionary comprises one or more pairs of a separate word from among a plurality of words and a particular category from among a plurality of categories associated with the separate word; and in response to identifying an unknown word not in the dictionary within the one or more words:

searching, by the computer, for the unknown word on a net;

in response to finding the unknown word on the net:
  obtaining by the computer, a description on a page on the net on which page the unknown word is found;
  extracting, by the computer, one or more second words from the description using morphological analysis;
  assigning, by the computer, using the dictionary, at least one second category from among the plurality of categories to the one or more second words extracted from the description;
  finding, among the one or more second words, a particular word to which a predetermined category was assigned, extracting a correlation word from among the one or more second words having a high correlation with the found particular word, and finding, in the dictionary, a search word from among the one or more first words assigned the at least one first category that is the same as the predetermined category;
  finding, from a repository, by the computer, resource data using the correlation word and the search word; and
  listing, by the computer, the resource data found for the resource.

2. The method according to claim 1, the method further comprising:
  in response to identifying the unknown word in the one or more words, searching for the unknown word on the repository, wherein the repository comprises pairs of separate resource data and separate skill information associated with the resource data, prior to searching for the unknown word on the net, wherein searching for the unknown word on the net is performed if the unknown word is not found in the repository.

3. The method according to claim 2, the method further comprising:
  in response to identifying the unknown word in the repository:
    finding, from the repository, the resource data comprising one or more of human resource data, machine resource data, and worksite data using the unknown word; and
    listing the found resource data comprising one or more of the human resource data, the machine resource data, and the worksite data.

4. The method according to claim 2, the method further comprising:
  proposing, by the computer, that the unknown word be added in the dictionary if the unknown word is in the repository.

5. The method according to claim 2, wherein the skill information comprises one or more of career information and specification information.

6. The method according to claim 1, wherein assigning, by the computer, at least one first category to at least one first word of the one or more words using a dictionary further comprises:
  finding a synonym of the at least one first words; and
  assigning a separate category from among the plurality of categories to the synonym word in replace of the at least one first word extracted from the search query.

7. The method according to claim 1, wherein the predetermined category is a category representing a skill of one or more of a human resource and a machine resource.

8. The method according to claim 1, wherein the predetermined category is a category representing a skill to be required for a worksite for one or more of a human resource and a machine resource.

9. The method according to claim 1, wherein the repository is one or more of a human resource repository, a machine resource repository, and a worksite repository.

10. The method according to claim 1, wherein searching, by the computer, for the unknown word on a net further comprises:
  searching, by the computer, for the unknown word on the net comprising a dictionary on at least one of an internet and an intranet.

11. The method according to claim 1, wherein the page comprises the unknown word as a header and the description comprises explanatory notes on the header.

12. The method according to claim 1, wherein listing, by the computer, the resource data found for the resource further comprises:
  listing, by the computer, the resource data comprising one or more of found human resource data, machine resource data, and worksite data, according to an order of priority.

13. The method according to claim 1, further comprising:
  in response to the dictionary comprises a keyword dictionary and a system dictionary, assigning, by the computer, the one or more particular categories to the one or more second words using the dictionary in the order of the keyword dictionary and then the system dictionary.

14. The method according to claim 1, wherein the plurality of categories in the dictionary comprise a first category representing a skill of the resource comprising one or more of a human resource and a machine resource, a second category representing a skill to be required in a worksite for one or more of the human resource or the machine resource, a category representing that a word relates to a question in a search query, or a category representing a part of speech.

15. The method according to claim 13, wherein a word in the keyword dictionary comprises a keyword representing a skill of one or more of a human resource, a machine resource, and a skill to be required in a worksite for one or more of the human resource and the machine resource.

16. The method according to claim 1, wherein assigning, by the computer, at least one first category to at least one first word of the one or more words further comprises:
  assigning an additional category representing an unknown word to the unknown word.

17. A computer system, comprising:
  one or more processors; and
  a memory storing a program which, when executed on the processor, performs one or more operations for finding a resource, the one or more operations comprising:
  receiving a search query from a user for finding the resource;
  extracting one or more words from the search query using morphological analysis;
  assigning at least one first category to at least one first word of the one or more words using a dictionary, wherein the dictionary comprises one or more pairs of a separate word from among the plurality of words and a particular category from among a plurality of categories associated with the separate word; and
  in response to identifying an unknown word not in the dictionary within the one or more words:
  searching for the unknown word on a net;
  in response to finding the unknown word on the net:
    obtaining a description on a page on the net on which page the unknown word is found;
    extracting one or more second words from the description using morphological analysis;

assigning, using the dictionary, at least one second category from among the plurality of categories to the one or more second words extracted from the description;

finding, among the one or more second words, a particular word to which a predetermined category was assigned, extracting a correlation word from among the one or more second words having a high correlation with the found particular word, and finding, in the dictionary, a search word from among the one or more first words assigned the at least one first category that is the same as the predetermined category;

finding, from a repository, resource data using the correlation word and the search word; and listing the resource data found for the resource.

18. The computer system according to claim 17, the operation further comprising:

in response to identifying the unknown word in the one or more words, searching for the unknown word on the repository, wherein the repository comprises pairs of separate resource data and separate skill information associated with the resource data, prior to the searching for the unknown word on the net, wherein the searching for the unknown word on the net is performed if the unknown word is not found in the repository.

19. A computer program product for finding a resource, the computer program product comprising a computer readable storage medium having program instructions embodied therewith, the program instructions executable by a computer to cause the computer to perform a method comprising:

receiving a search query from a user for finding a resource;

extracting one or more words from the search query using morphological analysis;

assigning at least one first category to at least one first word of the one or more words using a dictionary, wherein the dictionary comprises one or more pairs of a separate word from among the plurality of words and a particular category from among a plurality of categories associated with the separate word;

in response to identifying an unknown word not in the dictionary within the one or more words:

searching for the unknown word on a net;

in response to finding the unknown word on the net:

obtaining a description on a page on the net on which page the unknown word is found;

extracting one or more second words from the description using morphological analysis;

assigning, using the dictionary, at least one second category from among the plurality of categories to the one or more second words extracted from the description;

finding, among the one or more second words, a particular word to which a predetermined category was assigned, extracting a correlation word from among the one or more second words having a high correlation with the found particular word, and finding, in the dictionary, a search word from among the one or more first words assigned the at least one first category that is the same as the predetermined category;

finding, from a repository, resource data using the correlation word and the search word; and listing the resource data found for the resource to the user.

20. The computer program product according to claim 19, the method further comprising:

in response to identifying the unknown word in the one or more words, searching for the unknown word on the repository, wherein the repository comprises pairs of separate resource data and separate skill information associated with the resource data, prior to searching for the unknown word on the net, wherein searching for the unknown word on the net is performed if the unknown word is not found in the repository.

* * * * *